(12) United States Patent
Shelor et al.

(10) Patent No.: US 10,736,274 B2
(45) Date of Patent: *Aug. 11, 2020

(54) GROWING SYSTEM MIXING BOX

(71) Applicant: Greenhouse HVAC LLC, Jacksonville, FL (US)

(72) Inventors: F. Mack Shelor, Midlothian, VA (US); Doug Tyger, York, PA (US)

(73) Assignee: TROPOS TECHNOLOGIES, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,426

(22) Filed: Sep. 9, 2019

(65) Prior Publication Data
US 2020/0000045 A1    Jan. 2, 2020

Related U.S. Application Data

(63) Continuation-in-part of application No. 16/237,244, filed on Dec. 31, 2018, now Pat. No. 10,405,501, which is a continuation-in-part of application No. 15/975,229, filed on May 9, 2018, now Pat. No. 10,165,734.

(51) Int. Cl.
*A01G 9/02* (2018.01)
*A01G 9/24* (2006.01)
*A01G 9/18* (2006.01)

(52) U.S. Cl.
CPC .............. *A01G 9/02* (2013.01); *A01G 9/18* (2013.01); *A01G 9/24* (2013.01)

(58) Field of Classification Search
CPC ............ A01G 9/18; A01G 9/24; A01G 9/246
See application file for complete search history.

(56) References Cited

U.S. PATENT DOCUMENTS

| | | | |
|---|---|---|---|
| 4,567,732 A | 2/1986 | Landstrom et al. | |
| 4,569,150 A | 2/1986 | Carlson et al. | |
| 5,299,383 A | 4/1994 | Takakura et al. | |
| 8,707,617 B2 | 4/2014 | Houweling | |
| 9,161,498 B1 | 10/2015 | Shelor | |
| 2004/0194371 A1 | 10/2004 | Kinnis | |
| 2005/0005529 A1* | 1/2005 | Brault | A01G 7/045 52/63 |
| 2012/0260689 A1 | 10/2012 | Veltkamp | |
| 2017/0099785 A1 | 4/2017 | Zimmerman et al. | |

* cited by examiner

*Primary Examiner* — Monica L Barlow
(74) *Attorney, Agent, or Firm* — Mark Young, PA

(57) ABSTRACT

A growing system is equipped with a mixing box that features a PLC-controlled cooling coil and a heating coil in series. Gaseous inputs include air and $CO_2$. The coils facilitate condensation and maintain relative humidity and temperature in an acceptable range. An absorption unit or other chilled liquid source supplies chilled liquid for the cooling coil. Engine or boiler combustion provides hot liquid to the heating coil and $CO_2$-containing exhaust. Condensate is collected for reuse. The output to a growing space is a temperate low relative humidity $CO_2$-enriched stream optimal for plant health.

20 Claims, 17 Drawing Sheets

GROWING SYSTEM MIXING BOX

RELATED APPLICATION

This application is a continuation in part and claims the benefit of priority of U.S. Nonprovisional application Ser. No. 16/237,244 filed Dec. 31, 2018, which is a continuation in part and claims the benefit of priority of U.S. Nonprovisional application Ser. No. 15/975,229 filed on May 9, 2018, the entire contents of which are incorporated herein by this reference.

FIELD OF THE INVENTION

This invention relates generally to growing spaces, and, more particularly, to a mixing box system for regulating fresh air concentration, carbon dioxide concentration, relative humidity and temperature of gasses circulated in a growing system.

BACKGROUND

As used herein, a growing system is a system in which plants are grown. A greenhouse is a non-limiting example of a growing system. A growing system contains at least one growing space. A growing space is a space in a growing system in which plants are grown. A growing system may consist of a single growing space, may have more than one growing space, and may include spaces such as rooms that are not growing spaces. A nonlimiting example of such a room that is not a growing space may be a room that contains a boiler, cooling equipment or other equipment or supplies that would not be located in a growing space.

A mixing box in accordance with principles of the invention should be located in a growing space or in fluid communication with a growing space. The mixing box supplies temperature controlled, relative humidity controlled, $CO_2$-enriched air to the growing space. The mixing box also recovers water as condensation. One such mixing box may serve one growing space or more than one growing space. Spaces that are not growing spaces do not derive any benefit from $CO_2$ enriched air from the mixing box.

The various spaces of a growing system may be contained in one structure, or distributed among separate, but connected, structures. By way of example, a boiler of a growing system may be located in a structure that is separate and apart from a structure containing a growing space. Yet, the structure that contains the boiler and the structure that contains the growing space, constitute parts of the same growing system. Conversely, the boiler and growing space may be contained in separate rooms of the same structure, which also constitute parts of a growing system.

Plant growth is heavily influenced by the surrounding environmental climatic variables and by the amount of water and fertilizers supplied by irrigation. This is a main reason why a growing space is ideal for cultivation, since it includes a closed environment in which climatic and fertirrigation variables can be controlled to allow an optimal growth and development of the crop.

Among the climatic conditions are temperature, relative humidity (RH) and $CO_2$ concentration. For optimal growing of many plants, temperature in a growing system (e.g., a growing space or other indoor growing environment) should be controllable between 55° F. and 80° F. in the growing space. $CO_2$ concentration in the growing space should be controllable between atmospheric levels of 400 ppm and 1,500 ppm. And relative humidity in the space should controllable between 35% RH and 80% RH.

Transpiration is the loss of water from a plant in the form of water vapor. Water is absorbed by roots from the soil and transported as a liquid to the leaves via xylem. In the leaves, small pores allow water to escape as a vapor and $CO_2$ to enter the leaf for photosynthesis. Of all the water absorbed by plants, less than 5% remains in the plant for growth and storage following growth. Thus, 95% or more of the water absorbed by plants is transported as a liquid from the leaves. As typical plants in a growing space transpire, they may emit about 0.2 liters/plant/day to 3.0 liters/plant/day.

Transpiration serves several purposes, including cooling, nutrient distribution and $CO_2$ entry. As water evaporates or converts from a liquid to a gas at the leaf cell and atmosphere interface, energy is released. This exothermic process uses energy to break the strong hydrogen bonds between liquid water molecules; the energy used to do so is taken from the leaf and given to the water molecules that have converted to highly energetic gas molecules. These gas molecules and their associated energy are released into the atmosphere, cooling the plant.

Transpiration aids nutrition. The water that enters the root contains dissolved nutrients vital to plant growth. Transpiration enhances nutrient uptake into plants.

Transpiration also enables $CO_2$ intake. When a plant transpires, its stomata are open, allowing gas exchange between the atmosphere and the leaf. Open stomata allow water vapor to leave the leaf but also allow carbon dioxide ($CO_2$) to enter. Carbon dioxide is needed for photosynthesis to operate.

With very low humidity, a plant draws water from the soil at a very high rate. If the humidity is too low, the plant is unable to draw water at a rate equal to loss through the stomatal openings. The result is that the plants close their stomata, which slows the photosynthetic process (due to carbon limitations) and leads to stress, slow growth and compromised yield. Under severely low humidity, the plant may wilt and die because even its protective mechanisms cannot offset the water stress imposed by the lack of atmospheric water.

When humidity is too high, the rate at which plants draw water from the soil is reduced because transpiration is slowed by the smaller-than-normal water gradient between the plant and the atmosphere. This can result in diminished nutrient uptake efficiency, which can lead to nutrient deficiencies.

Fungus and bacteria are influenced by humidity and temperature. High humidity inside a growing space favors the formation of fungal spores, accelerating their development, as well as the growth of bacterial colonies, especially if temperatures are favorable. These risks increase when water vapor condenses on the plants. During daytime, relative humidity (RH) decreases in a growing space when temperature increases, although absolute humidity increases due to transpiration. At night, as the growing space cools, the RH increases and may reach saturation, at which point condensation occurs. Concomitantly, if transpired water cannot evaporate, such as because the relative humidity is high, then mold and bacteria may form and compromise the health of the plants.

In a growing space, mold formation may cause problems for workers and other occupants. Airborne mold spores may subject occupants to significant health hazards, especially allergies, asthma, hypersensitivity pneumonitis and other respiratory diseases.

Mold formation is particularly troubling for medicinal plants and plants that are consumed by inhalation. Mold on eaten vegetables can typically be digested. However, mold inhaled into lungs poses a serious health risk. Likewise, medicine tainted with mold poses a serious health risk.

Known growing systems address some environmental variables, individually. Some growing systems have been devised to enrich the air with $CO_2$. Others have been devised to heat air when ambient conditions are cold. Others cool air when ambient conditions are hot. If the source of $CO_2$ is a natural gas engine or boiler exhaust, it becomes difficult to prevent increases in temperature and water vapor beyond those suitable for plants. High temperature exhaust contains appreciable water vapor as a product of combustion. No prior art systems combine heating and cooling to control temperature and relative humidity of a $CO_2$ enriched stream of air while capturing condensate, particularly where the source of $CO_2$ is exhaust from a natural gas, methane or propane engine or boiler. No prior art systems combine $CO_2$-containing exhaust with recirculated air and fresh air in a mixing box in which the temperature and relative humidity of the combination is controlled by cooling followed by heating and water condensate is collected for re-use.

A growing space climate management system that allows for simultaneously maintaining a set of climate factors (temperature, humidity, $CO_2$, air) close to pre-established set point values, respecting certain rules established by a user, is needed. What is needed is a year-round system and method of maintaining the temperature and relative humidity of a $CO_2$ enriched stream of air within acceptable ranges for optimal plant growth in a growing space, while capturing appreciable condensate. The system should preferably be efficient, reliable, scalable and adaptable to existing growing spaces and other similar growing spaces. The system should work with $CO_2$ enrichment from exhaust from an engine or boiler that consumes natural gas, methane or propane.

The invention is directed to overcoming one or more of the problems and solving one or more of the needs as set forth above.

SUMMARY OF THE INVENTION

To solve one or more of the problems set forth above, in an exemplary implementation of the invention, a growing system equipped with a mixing box is provided. The mixing box features at least one cooling coil and at least one heating coil in series. The cooling coil facilitates condensation to maintain relative humidity in an acceptable range. The heating coil heats chilled $CO_2$-enriched air to an acceptable temperature for plant health. Condensate is collected for reuse. A drain beneath a cooling coil is fluidly coupled to a drain line, which is fluidly coupled to a vessel for collection. Appreciable cooling is necessary to achieve sufficient condensation in many environments, especially if moist hot $CO_2$-containing exhaust is introduced into the mixing box. The heating stage is necessary to return the multi-stage cooled $CO_2$-enriched air to an acceptable temperature and relative humidity.

Inputs and outputs from the mixing box are controlled by a PLC or similar digital control system. Controllable valves regulate flow of heated and chilled water or refrigerant to and from heating and cooling coils. Controllable dampers regulate the flow of gases (fresh air, recirculated air and $CO_2$-containing exhaust) to the mixing box. Controllable fans regulate flow across the growing space, and exhaust from the growing space.

An exemplary growing system mixing box according to principles of the invention includes a housing through which gaseous fluids (e.g., air, recirculated air, exhaust containing $CO_2$ from a natural gas, methane or propane fueled engine or boiler) flow. A plurality of inlets (e.g., a fresh air inlet, a $CO_2$-containing exhaust inlet, and a recirculation air inlet) is provided to admit each of the fluids into the housing. An outlet is provided in fluid communication with a growing space that contains plants. The outlet is spaced apart from the plurality of inlets. At least one cooling coil is disposed between the plurality of inlets and the outlet. A heating coil is provided, in series with the cooling coil, between the cooling coil and the outlet. The $CO_2$-containing exhaust inlet is fluidly coupled to one of a natural gas, methane or propane engine or boiler. Each coil includes an inlet line and an outlet line. A heated or cooled fluid flows through the inlet line, through the coil and out of the coil through the outlet line. Fluids for a cooling coil may be chilled water, a water and glycol solution, or refrigerant. Fluids for a heating coil may comprise heated water or a water and glycol solution. An electrically controlled valve (e.g., modulating valve) controls fluid flow through each inlet line into a coil. There is at least one electrically controlled valve per inlet line. A plurality of dampers is also provided. One or more dampers may control flow through each inlet of the plurality of inlets. Each damper is an electrically actuated damper.

A plurality of sensors is provided in the growing space. A controller (e.g., a PLC) is operably coupled to each of the valves, dampers and sensors. The sensors provide input to the controller. The sensors include a humidity (e.g., relative humidity) sensor, a $CO_2$ sensor, a temperature sensor and a light sensor. In addition to or in lieu of a light sensor, a clock or timer may be used to determine whether daylight or nighttime parameters should be applied. A plurality of setpoints is stored on the controller. The setpoints include daylight and nighttime setpoints for temperature, relative humidity and $CO_2$ concentration. Each setpoint may comprise a range of target values. The controller controls the valves and dampers to maintain output from the humidity sensor, the $CO_2$ sensor, and the temperature sensor within applicable setpoints. Thus, sensed humidity is maintained within the daytime or nighttime humidity setpoint. Similarly, temperature is maintained within the daytime or nighttime temperature setpoint. Likewise, $CO_2$-concentration is maintained within the daytime or nighttime $CO_2$ setpoint.

In another exemplary embodiment, a mixing box system according to principles of the invention includes a housing through which gaseous fluids flow. The housing has several inlets and an outlet spaced apart from the inlets. The inlets may include an inlet supplying $CO_2$-containing products of combustion of one of methane, natural gas or propane, a fresh air inlet and a recirculation air inlet. Additionally or alternatively, $CO_2$-containing products of combustion may be supplied directly to the growing space; in which case, products of combustion that are not consumed in the growing space may be drawn into the mixing box via a recirculation inlet. A cooling coil is disposed between the inlets and the outlet. The cooling coil has a cooling coil inlet line and a cooling coil outlet line. A heating coil, in series with the cooling coil, is between the cooling coil and the outlet. The heating coil includes a heating coil inlet line and a heating coil outlet line. The cooling coil contains a chilled liquid (e.g., chilled water, or water and a glycol, from a cooling system, such as an absorption unit) while the heating coil contains a heated liquid.

An inlet supplying $CO_2$-containing products of combustion may be fluidly coupled to an exhaust outlet of a natural gas, methane or propane engine or of a natural gas, methane or propane boiler. The engine or boiler also provides heated liquid (e.g., superheated water) to the the heating coil inlet line and receives the liquid returned from the heating coil outlet line.

A cooling system, such as an absorption chiller, supplies chilled liquid to the cooling coil inlet. The cooling coil outlet line returns chilled liquid from the cooling coil to the absorption chiller.

A drain disposed beneath the cooling coil is fluidly coupled to a drain line. The drain line is fluidly coupled to a vessel. The vessel collects substantial water from condensation within the mixing box system.

A controllable fan within the housing is operably coupled to a controller that controls operation and volumetric flow rate of the fan.

Dampers may control flow through each gaseous inlet. Each damper may be an electrically actuated damper operably coupled to a controller that controls operation.

Valves control flow through the cooling coil and the heating coil. Each valve may be an electrically actuated valve operably coupled to and controlled by a controller.

A growing space contains plants. The mixing box outlet is fluidly coupled to the growing space. The recirculation air inlet is also fluidly coupled to the growing space. Thus, flow proceeds from the outlet into the growing space and then into the recirculation air inlet.

Sensors are provided in the growing space. The sensors are operably coupled and provide input to a controller. The sensors may include a humidity sensor, a $CO_2$ sensor, a temperature sensor and a light sensor. In addition to or in lieu of a light sensor, a clock or timer may be used to determine whether daylight or nighttime parameters should be applied. Setpoints are stored on the controller. The setpoints include setpoints for daylight and for nighttime. Daylight setpoints are applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

In one embodiment, the mixing box system includes a boiler having an exhaust outlet and a heated liquid outlet, and a liquid inlet. The system also includes a cooling system such as an absorption unit having a hot liquid outlet. The system also includes a cooling tower, having a liquid inlet and a liquid outlet. The system also includes a heat exchanger fluidly coupled to the exhaust outlet of the boiler. The heat exchanger has three coils, including a first coil having an inlet fluidly coupled to the liquid outlet of the cooling tower and an outlet fluidly coupled to the inlet of the cooling tower, a second coil having an inlet fluidly coupled to the heating coil inlet line of the heating coil and an outlet fluidly coupled to the liquid inlet of the boiler, and a third coil having an inlet fluidly coupled to the hot liquid outlet of the absorption unit and an outlet fluidly coupled to the liquid inlet of the boiler.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures. Operating parameters specified herein, including any temperatures, concentrations and relative humidity levels, whether specified in the figures, written description or both, are provided as nonlimiting examples and do not restrict the invention. Operating parameters may vary without departing from the scope of the invention.

DETAILED DESCRIPTION

Figure 1:
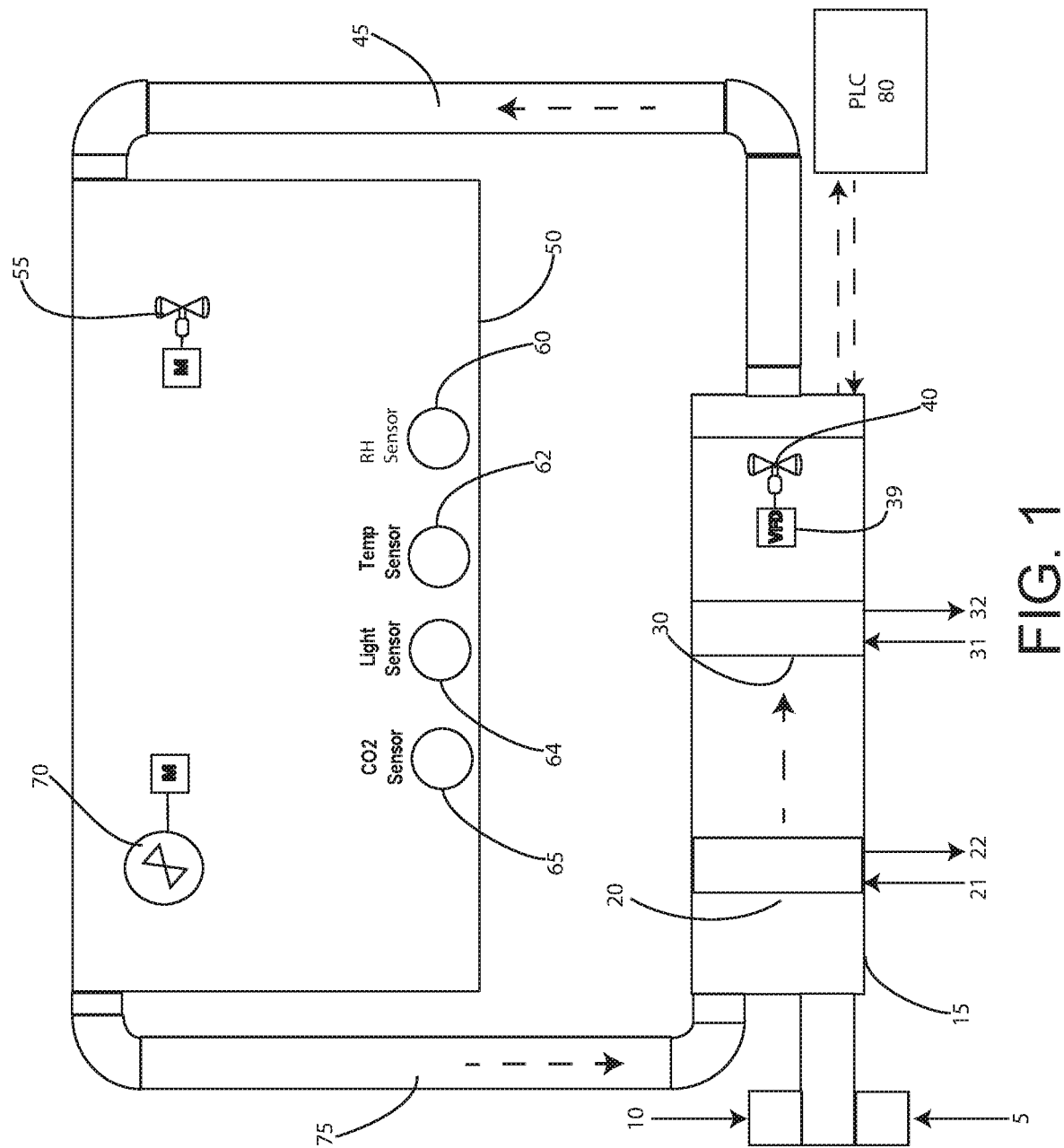
FIG. 1 is a schematic of a growing system with an exemplary mixing box according to principles of the invention.

In an exemplary embodiment of FIG. 1, a mixing box 15 according to principles of the invention contains at least one cooling coil (e.g., cooling coil 20), a heating coil 30, and outlet fan 40. The invention does not require two cooling coils 20. One or more cooling coils may provide adequate cooling. The invention is not limited to one outlet fan 40. One or more outlet fans may be provided. Inlets to the mixing box 15 include a recirculation conduit 75, a fresh (external) air inlet 10, and a $CO_2$ or $CO_2$-containing exhaust inlet 5. An outlet conduit 45 fluidly couples the mixing box 15 to a growing space 50. The mixing box 15 supplies temperature and humidity controlled $CO_2$-enriched air to the growing system, such as growing space 50. Dampers may control flow through conduits 45, 75, and through inlets 5, 10. Valves control flow of heated or cooled liquids through supply and return lines 21, 22 and 31, 32 for the cooling coil 20 and the heating coil 30.

In normal operation, $CO_2$ concentration, lighting, temperature and relative humidity distributed in the growing space are measured from sensors 60-65. Measured values are transmitted to a controller, such as a programmable logic controller (PLC) 80, for monitoring and control. The PLC 80 includes analog and digital inputs and outputs, including inputs for receiving signals from sensors and outputs for control signals for flow control elements. The PLC 80 also includes memory and processing circuitry to receive and process inputs, determine appropriate outputs according to a programmed algorithm, and output control signals corresponding to the determined appropriate outputs. The PLC 80 thus controls flow control elements such as dampers, valves and motor controllers, to maintain temperature, relative humidity and $CO_2$ concentration within predetermined ranges for optimal plant growth. The ranges may vary according to plant, season, and time of day. The ranges may be user input values and/or determined from an algorithm and/or from one or more databases of values.

In lieu of a PLC, a microcontroller-based control system may be utilized. Such a control system would be appropriate where many units may be produced, so the development cost (design of power supplies, input/output hardware, and programming) can be spread over many sales, and where the end-user would not need to alter the control.

In one nonlimiting example, the PLC 80 may implement proportional-integral-derivative (PID) control. PID control is a control loop feedback methodology for continuously modulated control. In such an implementation, the PLC 80 continuously or repeatedly calculates an error value, e(t), as the difference between a desired setpoint (SP) and a measured process variable (PV), such as temperature, relative humidity and $CO_2$ concentration, and applies corrections based on proportional, integral, and derivative terms. Thus, the PLC 80 automatically applies accurate and responsive correction to a control function. The correction may take the form of closing, partially closing, opening or partially opening one or more flow control dampers 120, 140, 205, 215, 270 (FIGS. 2 & 3) and/or one or more flow control valves on lines 22 and 32. Such dampers and valves may control fluid flow to, through and from the mixing box or components of the mixing box. The correction may also take the form of increasing or decreasing the rate of rotation of one or more motors powering fans 40, 55, 70. Such motors may control flow through a growing space, from the mixing box and into the mixing box.

In an exemplary embodiment, the fan 40 in the mixing box and the exhaust (recirculation) fan 70 in the growing space are Variable Air Volume (VAV) fans. Plants at different stages of growth may transpire significantly different amounts of moisture. To adapt the mixing box to the widely changing transpiration amounts, the fans may operate over a very large range of air changes in the space. Generally VAV fans may operate over a range of about 20% to 100% of their rated flow. In an exemplary implementation, this could achieve anywhere from 40 air changes per hour in the growing space down to one air change per hour in the air space. Where single grow spaces have plants with various stages of growth in the same space, the number of air changes in the space may only require a variability of between 4 air changes and 8 air changes. The amount of moisture that can be removed depends on the amount of air over the coils. With VAV fans, a mixing box according to principles of the invention can adjust volumetric air flow to dehumidify almost any known plant environment.

The PLC 80 is communicatively coupled to input devices, such as an interface or computer for user input and sensors for measuring process variables. In an exemplary embodiment, the senors include a $CO_2$ sensor 65, a light sensor 64, a temperature sensor 62 and a relative humidity sensor 60. Nonlimiting examples of a $CO_2$ sensor 65 include a non-dispersive infrared (NDIR) $CO_2$ sensor and a chemical $CO_2$ gas sensor with sensitive layers based on polymer- or heteropolysiloxane. Nonlimiting examples of a light sensor include a photodetector, such as a photodiode, charge coupled device, CMOS image sensor, phototransistor, and a photo-voltaic cell. In addition to or in lieu of a light sensor, a clock or timer may be used to determine whether daylight or nighttime parameters should be applied. The temperature sensor 62 is a thermostat. Nonlimiting examples include thermostats with bimetallic mechanical or electrical sensors, expanding wax pellets, electronic thermistors and/or semiconductor devices, and electrical thermocouples. Nonlimiting examples of relative humidity sensors 60 are humidistats.

The PLC 80 is operatively coupled to flow control valves (e.g., electrically or pneumatically actuated valves), which control flow of liquid. A solenoid valve is an electromechanically operated valve, and one nonlimiting example of a suitable flow control valve. One or more such valves may control the flow of a heated liquid (e.g., water) to and/or from heating coil 30, via inlet 31 and outlet 32 lines. One or more such valves may control the flow of a cooled fluid (e.g., water or refrigerant) to and/or from a cooling coil 20 via inlet 21 and outlet 22 lines.

The PLC 80 is operatively coupled to flow control dampers. Such dampers may control flow through recirculation conduit 75, inlets 5, 10, and optionally outlet 45. A damper is a valve or plate that stops or regulates the flow of fluid (primarily gaseous) inside a duct or other handling equipment. A damper may be used to cut off flow or to regulate flow. The dampers are operated by electric or pneumatic motors, solenoids or other actuators or valves controlled by the PLC 80 or another compatible controller. The degree of flow may be calibrated, perhaps according to signals from inputs going to the PLC in order to modulate the flow to effect climate control.

The PLC 80 may also be operatively coupled to motor controllers. The motor controllers may be binary (on/off) controllers or variable speed controllers. Such controllers (e.g., 39) control the output fan 40 of the mixing box 15, thereby controlling volumetric flow rate from the mixing box 15. Similarly, circulation fans 55 and exhaust (return) fans 70 within the growing space 50 are controlled by the PLC 80. Ceiling fans 55 inside the growing space are intended to be activated to create enough turbulence to avoid temperature and relative humidity stratification or dead zone areas.

One non-limiting example of a variable speed controller is a variable-frequency drive (VFD) 39, which is a type of adjustable-speed drive used in electro-mechanical drive systems to control AC motor speed and torque by varying motor input frequency and voltage. Each controlled motor 40, 55, 70 may be equipped with such a drive. AC electric motors used in a VFD system are usually, but not necessarily, three-phase induction motors. If DC motors are used, a controller that varies supply voltage, such as by varying resistance, may be used to control rate of rotation.

The invention is scalable. One or more sensors may be located in the growing space. One or more PLCs may control one or more portions of a large growing space. Each portion may include flow control elements controlled by the PLC.

Figure 2:
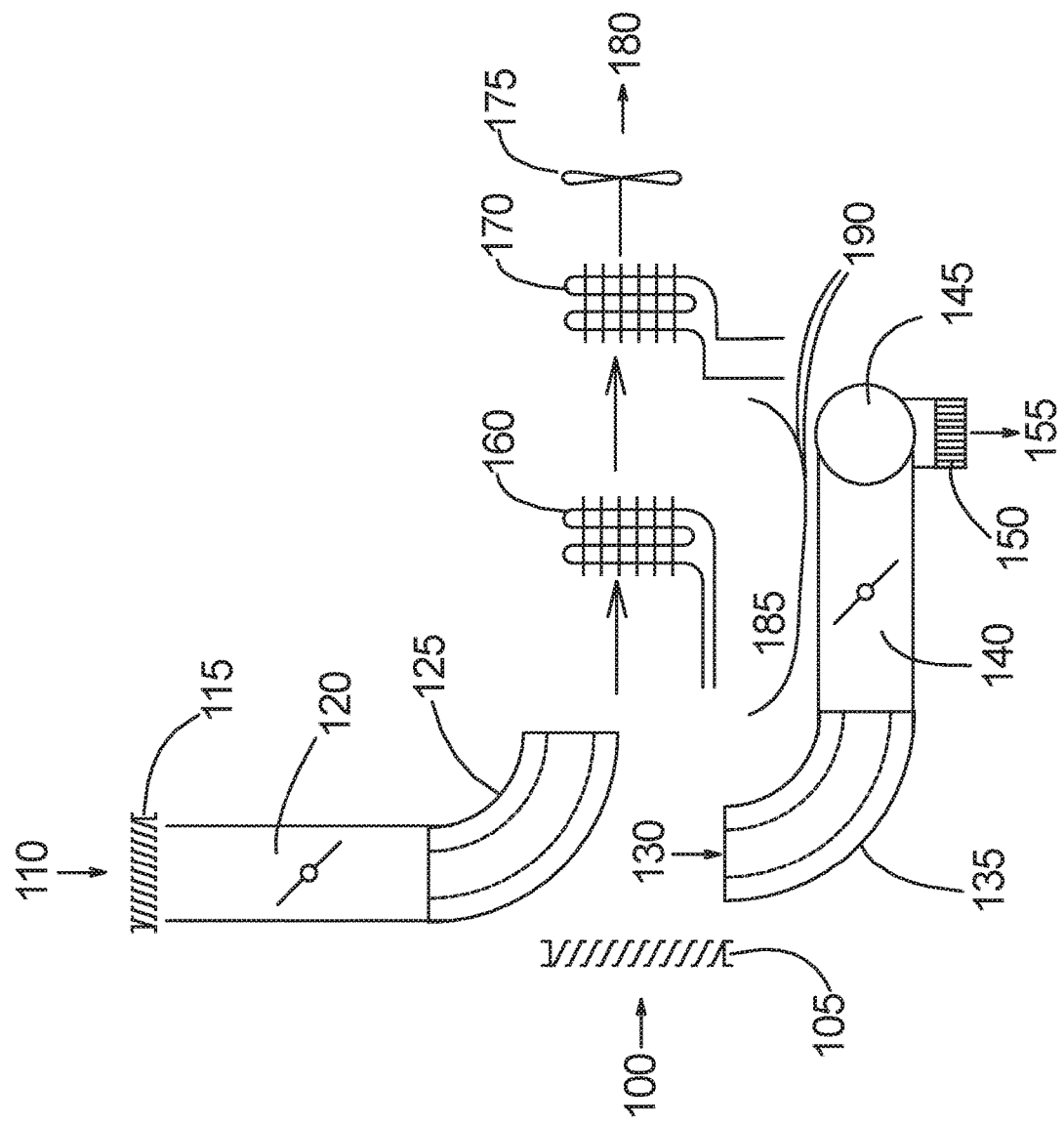
FIG. 2 is a schematic of an exemplary mixing box for a growing system according to principles of the invention.

With reference to FIG. 2, components of another exemplary mixing box are conceptually illustrated. Here the components include an inlet filter 105 which receives air (e.g., fresh air) from a source 100 such as an inlet duct. Another filter 115 is provided in communication with a return duct 125, which contains a damper 120. The return duct 125 returns air from the growing space 50. Another duct 135, controlled by a damper 140, supplies $CO_2$ or $CO_2$-containing exhaust to the mixing box. The $CO_2$-containing exhaust may optionally pass through a filter or catalytic converter 150 and fan or blower 145 en route to the duct 135. The mixing box of FIG. 2 includes a cooling coil 160 and a heating coil 170, in series. However, a cooling box according to principles of the invention is not limited to one cooling coil or one heating coil. Rather, at least one cooling coil may provide sufficient cooling, and at least one heating coil may provide sufficient heating. More than one cooling coil and/or more than one heating coil may be used within the scope of the invention. An outlet fan 175 produces an outlet stream 180 to the growing space 50. In this embodiment, a drip pan or basin 185 collects condensate from condensation at the cooling coil 160. The pan or basin 185 drains into plumbing 190 that can be used to replenish water stored for cooling, heating and/or irrigation. In this manner, condensate, which can include substantial water transpired from plants, is recycled. Each embodiment of a mixing box according to principles of the invention may contain a drip pan or basin and plumbing to collect condensate for reuse.

Figure 3:
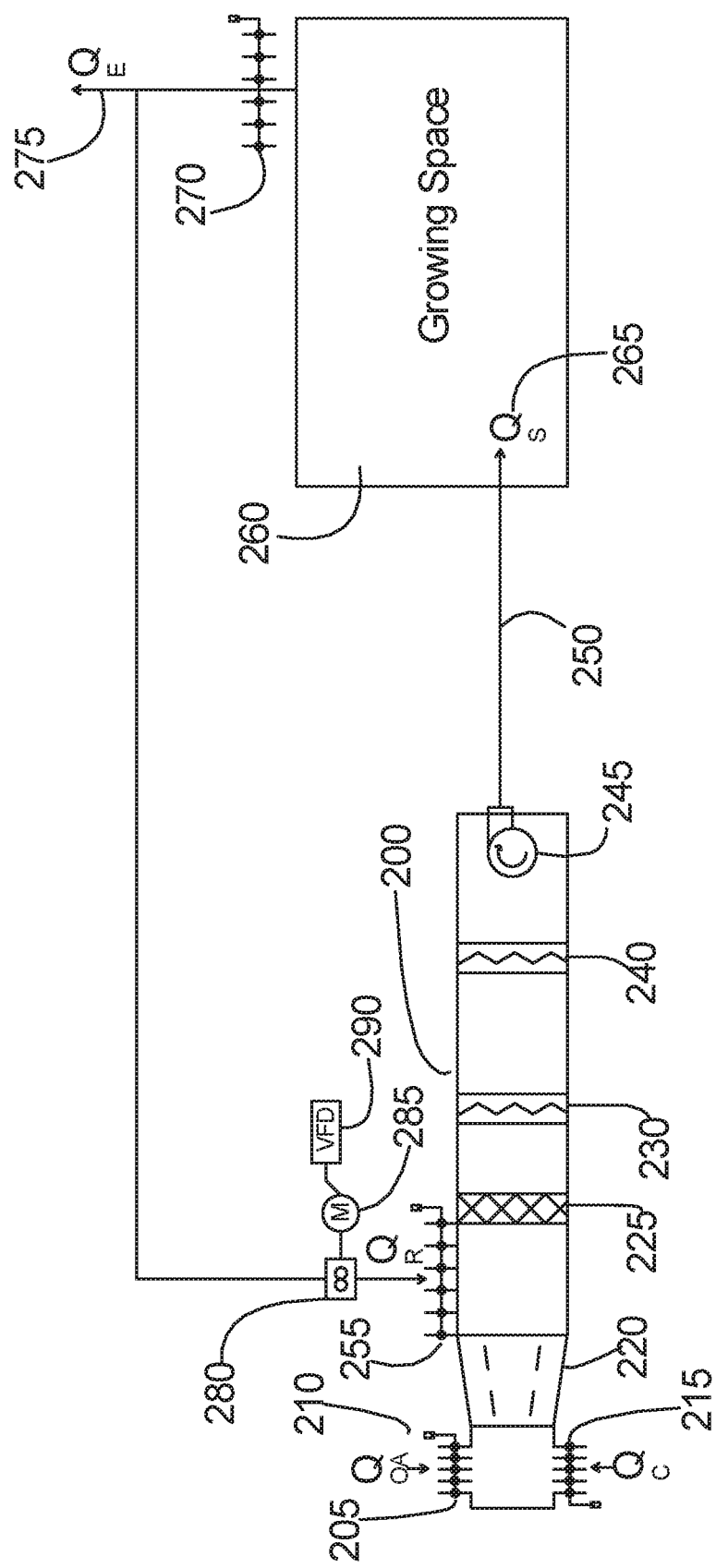
FIG. 3 is a schematic of another exemplary mixing box for a growing system according to principles of the invention.

With reference to FIG. 3, another exemplary mixing box 200 is conceptually illustrated. Here the mixing box 200 includes inlets which receive air (e.g., fresh outside air, $Q_{OA}$) from a source 210 such as an inlet duct with dampers 205 to control flow, $CO_2$ enriched air ($Q_C$) from another source, through another set of flow control dampers 215, and return air ($Q_R$) from conduit from an exhaust controlled by dampers 270 in the growing space, again through flow control dampers 255. The mixing box 200 includes a diverging channel 220 between the inlets. The combined inputs pass through a filter 225 before passing through a series of coils. The mixing box of FIG. 3 includes one cooling coil 230 and a heating coil 240, in series. However, a cooling box according to principles of the invention is not limited to one cooling coil or one heating coil. Rather, at least one cooling coil may provide sufficient cooling and at least one heating coil may provide sufficient heating. An outlet blower 245 produces, through a conduit 250, an outlet stream ($Q_S$) 265 to the growing space 260. Some exhausted air may pass to the environment 275, such as if recirculation dampers 255 are closed. A motor 285, optionally with a VFD controller 290, powers a fan or blower 280 that supplies the recirculated air back to the mixing box 200. However, the mixing box 200 may be used without the fan 280, motor 285 and controller 290.

A mixing box according to principles of the invention recovers water from transpiration. Transpiration is the loss of water from a plant in the form of water vapor. Water is absorbed by roots from the soil and transported as a liquid to the leaves via xylem. In the leaves, small pores allow water to escape as a vapor and $CO_2$ to enter the leaf for photosynthesis. Of all the water absorbed by plants, less than 5% remains in the plant for growth and storage following growth. Thus, 95% or more of the water absorbed by plants is returned to the atmosphere. As typical greenhouse plants transpire, they may emit about 0.2 liters/plant/day to 3.0 liters/plant/day, much of which can be recycled using a mixing box according to principles of the invention.

Environmental conditions, including relative humidity (RH), temperature and lighting appreciably affect transpiration. Any reduction in RH creates a gradient for water to move from the leaf to the atmosphere. The lower the RH, the less moist the atmosphere and thus, the greater the driving force for transpiration. When RH is high, the atmosphere contains more moisture, reducing the driving force for transpiration.

Temperature greatly influences the magnitude of the driving force for water movement out of a plant. As temperature increases, the water holding capacity of that air increases and RH decreases. Therefore, warmer air will tend to increase the driving force for transpiration and cooler air will tend to decrease the driving force for transpiration.

Lighting conditions also affect transpiration. Stomata are pores in a leaf that allow gas exchange where water vapor leaves the plant and carbon dioxide enters. Cells called guard cells control each pore's opening or closing. When stomata are open, transpiration rates increase; when they are closed, transpiration rates decrease. Stomata are triggered to open in the light so that carbon dioxide is available for the light-dependent process of photosynthesis. Stomata are closed in the dark in most plants.

The invention regulates environmental conditions within a growing space to facilitate transpiration and optimize plant health. Relative humidity and temperature are kept within acceptable ranges. Air entering the growing space from the mixing box is enriched with $CO_2$, primarily only during daylight conditions when stomata are open and receptive to $CO_2$.

Condensation in the mixing box lowers the relative humidity of the air exiting the mixing box. Multi-stage cooling in the mixing box allows removal of substantial water vapor from the air, even after high temperature $CO_2$-containing exhaust has been introduced. Post-condensation heating of the cooled air further lowers the relative humidity. Each, in turn, facilitates transpiration.

In contrast, excessive humidity not only retards transpiration and wastes water that can otherwise be recycled, but leads to molding and other undesirable conditions. During cooler evening hours, in a conventional growing space without a mixing box according to principles of the invention, condensate may accumulate on leaves, buds and fruit. In a humid environment, evaporation is retarded. Over time, accumulated water on plants leads to mold and other undesirable conditions.

The thermodynamic process of the system is based on the predefined conditions of the psychrometric conditions of the air inside the growing space corresponding to the mixing box design. The mixing box is a system for providing continuous heating, cooling, and humidity control as well as controlled flow of $CO_2$, on an as needed basis, regardless of the outside environment, and based on continuous readings of the actual conditions inside the growing space.

During "daylight", the light sensor 64 is "on" due to either natural light entering the growing space or by a lighting system. In addition to or in lieu of a light sensor, a clock or timer may be used to determine whether daylight or nighttime parameters should be applied. While the light sensor 64 senses daylight conditions (i.e., natural or artificial daylight conditions), $CO_2$ is allowed to ingress. When $CO_2$ concentration in the growing space reaches a target level, the outside air is allowed to enter through the mixing box and blend in to maintain the $CO_2$ concentration in the growing space volume. During nighttime conditions, when there is little or no light inside the growing space, $CO_2$ injection (i.e., introduction of $CO_2$-containing exhaust) is stopped as plants "rest," with no $CO_2$ consumption expected. A mixing box according to principles of the invention thus controls $CO_2$ injection during the "light" hours to provide $CO_2$-enriched air with a $CO_2$ concentration within a desired range. If $CO_2$ concentration in a growing space exceeds a desired range (i.e., exceeds a setpoint), the PLC 80 causes the mixing box 15 to reduce or stop $CO_2$ injection. Likewise, during "night" hours, the PLC 80 causes the mixing box 15 to reduce or stop $CO_2$ injection. Daylight setpoints are applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

An exemplary source of $CO_2$ is a natural gas, methane or propane fueled engine or boiler. U.S. Pat. No. 9,161,498 describes a suitable natural gas fueled generator that produces exhaust containing $CO_2$. Such a generator may be utilized to generate electricity and $CO_2$ for a growing system.

The light sensor(s) (e.g., photodetector) 64 inside the growing space is an example of an element to deactivate/activate the injection of $CO_2$. The light sensor 64 is coupled to the controller, e.g., PLC 80. The PLC 80 uses from the light sensor 64 to determine whether to implement daylight or nighttime control of $CO_2$ injection. $CO_2$ injection may be controlled by opening or closing valves or dampers that regulate flow of $CO_2$-containing exhaust into the mixing box. In addition to or in lieu of a light sensor, a clock or timer may be used to determine whether daylight or nighttime parameters should be applied. Daylight setpoints are applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

Continuous measurement of temperature and RH in the growing space are provided using a thermostat 62 and humidistat 60. Several thermostats 62 and humidistats 60 may be distributed throughout the growing space to determine values within each zone, and averages and variances among zones and/or as a function of time. Ceiling fans 55 may be controlled to avoid temperature and RH concentrations by distributing air across the growing space.

By way of example and not limitation, during daytime, $CO_2$ concentration ranges between 800 ppm and 1,500 ppm in the growing space, with the ability to adjust these set points to suit variations in crops as desired. During nighttime, temperature, target RH and $CO_2$ levels may be different. These properties may for example be 60 F, 60% RH and 400 ppm of $CO_2$.

In operation, the PLC 80 may cause the $CO_2$ damper 140, 215 to close during the nighttime and minimize $CO_2$ injection, and open once the lighting sensor 64 detects daylight in order to raise $CO_2$ levels as quick as possible-once $CO_2$ concentration reaches to a target level range (800-1,500 ppm). At this point, external air may be allowed to enter through the mixing box. This may be accomplished by implementing a split range control. When there is light and $CO_2$ levels are low, the split range system may gradually open the $CO_2$ damper and gradually closes the damper that regulates external air entrance.

In addition to or in lieu of a light sensor, a clock or timer may be used to determine whether daylight or nighttime parameters should be applied. Daylight setpoints are applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

When $CO_2$ concentration reaches the maximum setpoint, the $CO_2$ level is sensed and the $CO_2$ damper may be fully or partially closed while the external air damper may be fully or partially opened. Any opening-closing activity may be with an overlap to avoid unstable operation.

If the temperature of the air emitted from the mixing box is at a minimum setpoint (e.g., 52° F.), valves for one or both cooling coils are adjusted to decrease cooling, and/or valves for the heating coil may be fully opened to increase heating.

When air enters the mixing box, water from transpiration, now being carried by the growing space air, needs to be removed via condensation. The heat rejection is done through the cooling coil in order to remove the "sensible cooling" and to "de-humidify" the air as it has gained temperature and humidity inside the growing space. The temperature of the air circulating through the mixing box is reduced by the cooling coil 20, such that moisture condensation may occur and water (i.e., condensate) is removed. The amount of water is approximately equivalent to the water from transpiration of the plants inside the growing space. Chilled air downstream from the cooling coil 20 is suitable to be put back into the growing space once heated in the subsequent heating coil 30.

Cooling may be performed by circulating chilled water from a cold water source, such as an absorption chiller 502, via a temperature control that modulates the amount of chilled water, and based on the temperature of cooled air downstream the cooling coil. U.S. Pat. No. 9,161,498 describes a suitable absorption unit (i.e., absorption chiller 502) that produces chilled water. Such an absorption unit may be utilized to supply chilled water to the cooling coil 20. However, the invention is not limited to a particular source of chilled liquid.

Another source of cooled liquid for the cooling coil 20 is refrigerant. A refrigeration cycle system may be provided to circulate and chill refrigerant. Such a system may include a compressor for compressing and circulating a refrigerant. Compressed heated vapor refrigerant from the compressor travels through a condenser, where it is cooled and condenses into a liquid. The cooled liquid refrigerant then passes through an expansion valve where its pressure and temperature rapidly drop. The cold liquid or liquid vapor mixture travels through one or both cooling coils 20 to chill the air passing through the coils. Refrigerant from the coil 20 then returns to the compressor for another cycle.

Alternatively, refrigerant from a refrigeration cycle cooling system may cool water, which may be supplied to the cooling coil 20. In this embodiment, cooling coils may be provided in a water bath to cool the water. In another embodiment, water may flow through coils chilled by cold air. In another embodiment, water may flow through coils chilled by refrigerant cooled coils.

By way of example and not limitation, an absorption unit supplies chilled water to cool the cooling coil 20. Alternatively, a refrigeration unit may supply a cooled glycol and water solution to the cooling coil 20. Such a refrigeration unit cools a bath or tub of glycol and water solution, typically below the freezing point of water. The cooled liquid solution may be pumped though a looped circuit of tubing connected to the input and output lines of the coil 20.

An absorption unit (i.e., absorption chiller), refrigeration cycle cooler and any other cooling equipment suitable for cooling a liquid such as water or water and glycol is generically referred to herein as a chilling apparatus. Chilling apparatus broadly encompasses all equipment that cools the liquid in accordance with the principles of the invention as described herein. An absorption unit (i.e., absorption chiller) and refrigeration cycle cooler are non-limiting examples of a chilling apparatus.

In an exemplary implementation, the cooling coil 20 chills the air in the mixing box to 60° F. to 40° F., preferably 58° F. to 48° F., and more preferably 55° F. to 51° F. The heating coil 30 heats the chilled air to a temperature of 70° F. to 55° F., preferably 65° F. to 58° F., and more preferably about 60° F.

During fall and winter seasons, the temperature setpoint may be set to allow for a margin of heat loss due to the temperature gradient and heat flow from the growing space to ambient surroundings. An increment of 10 to 20° F. in temperature set point is estimated for northern climates and modern greenhouses. Thus, warmer air entering the growing space from the mixing box will become cool as heat is transferred from the warmer air to the ambient environment. The actual increment may be assessed with growing space operation experience. The increment compensates for heat loss to the ambient (outdoor) environment.

Air coming from the mixing box is distributed, preferably evenly distributed, in the growing space. Distribution is gauged via measured temperature and relative humidity across the growing space. In order to accomplish this, temperature sensors and relative humidity sensors are placed in pre-determined locations that represent a uniform distribution. In case of maldistribution, air temperature and subsequently relative humidity can deviate from the desired set points, e.g., 75° F. and 75% RH. These sensor readings are provided to the PLC 80 for control action. The PLC performs an average and variance analysis of the temperature over the whole growing space to activate a temperature control logic, which allows a change of the speed of the fans drives to maintain an average equivalent to the setpoint, e.g., 75° F. If the variance of the measured temperature equals or exceeds a threshold amount, e.g. 5° F. or more, an alarm may be activated to prompt corrective actions at the specific locations of the deviation(s).

Similarly, if for any reason, the average relative humidity falls outside a setpoint range (e.g., 70% to 85%), despite the temperature average, the PLC may initiate steps for corrective action. For example, the PLC may override the speed of the fan drivers to push more air if the average relative humidity is above the RH range so it can be lowered.

Alternatively, the PLC may override the speed to lower it to allow the increment of relative humidity if it is averaging too low. Similarly, if there is an appreciable variance of the measured relative humidity, an alarm may be activated to take corrective actions in the specific locations of the deviations.

When heating coil downstream temperature of the air is at 57° F., the control valve opening may be at the minimum possible opening. If the heating coil downstream temperature reduces further to a temperature below 57° F., the temperature control valve may completely open to allow for maximum boiler water circulation.

The invention is not limited to use of a boiler for heated water. Engine heat may be used to heat water. In such an embodiment, a liquid coolant is circulated around a natural gas, methane or propane engine, where it is heated. At least some of the heated liquid may be directed through one or more valves to a line into the heating coil and a line out of the heating coil. The line out directs the liquid back to the engine for reheating. Thus, the heating coil may act as a heater core, heating the air-$CO_2$ mixture moving through the mixing box.

The heating coil downstream temperature starts rising due to circulation of boiler water. When outlet temperature of the air is at 57° F., the temperature control valve may start to open to allow heat input on the heating coil to restore air back to the temperature setpoint (60° F.).

In normal operation, temperature and relative humidity distributed in the growing space are measured and values are transmitted to the PLC for status monitoring.

Air coming from the mixing box is distributed evenly in the growing space. This is measured via temperature and relative humidity sensors across the growing space.

If for any reason, the average relative humidity falls outside the range of 70% to 85%, despite the temperature average, an action on the control system can override the speed of the fan drivers to push more air if the average relative humidity is above the RH range so it can be lowered, or it may override the speed to lower it to allow the increment of relative humidity if it is averaging too low. Similarly, if there is a variance of the measured relative humidity, an alarm may be activated in order to take corrective actions in the specific locations of the deviations.

Figure 4:
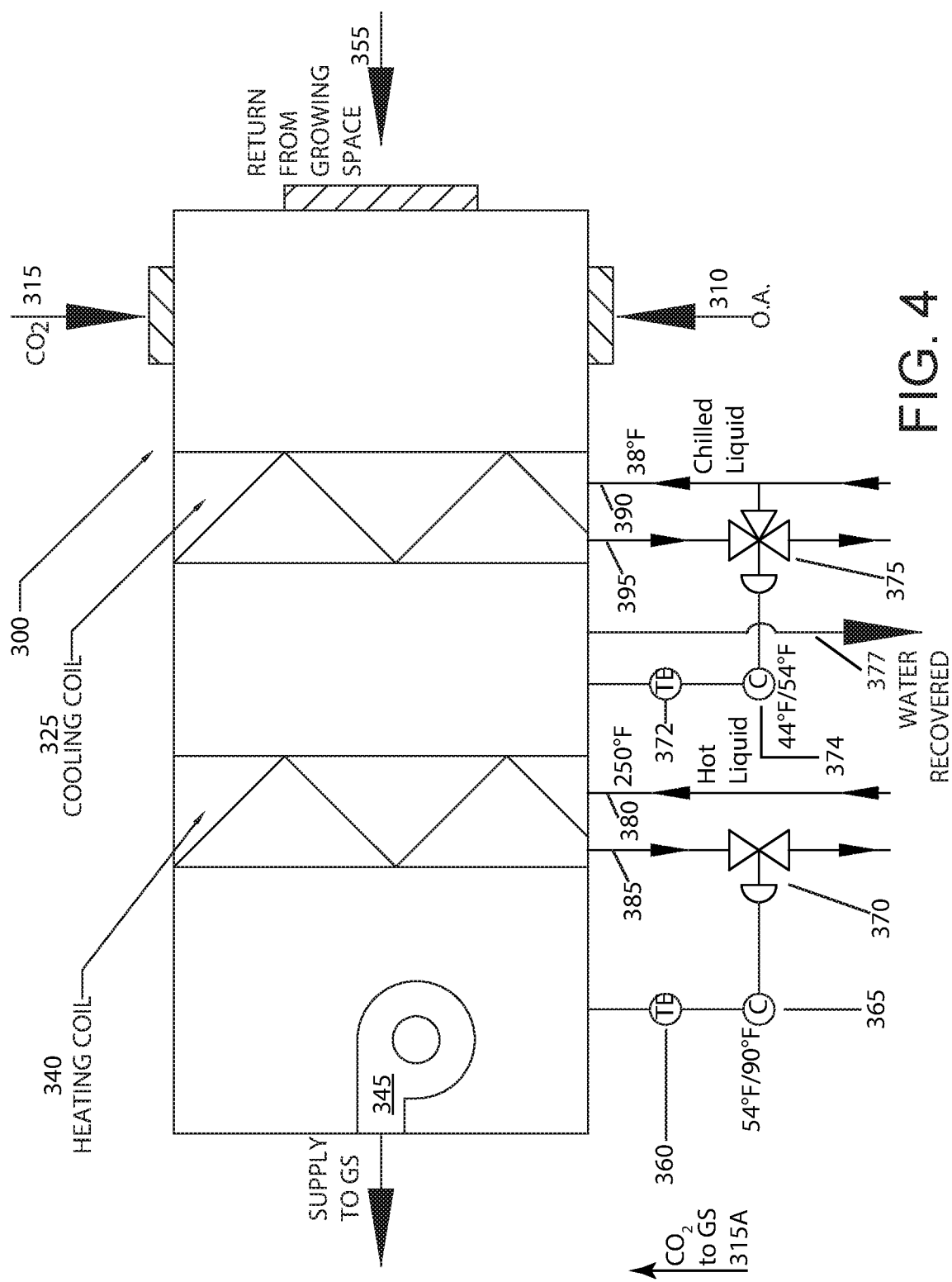
FIG. 4 is a schematic of another exemplary mixing box for a growing system according to principles of the invention.
Figure 5:
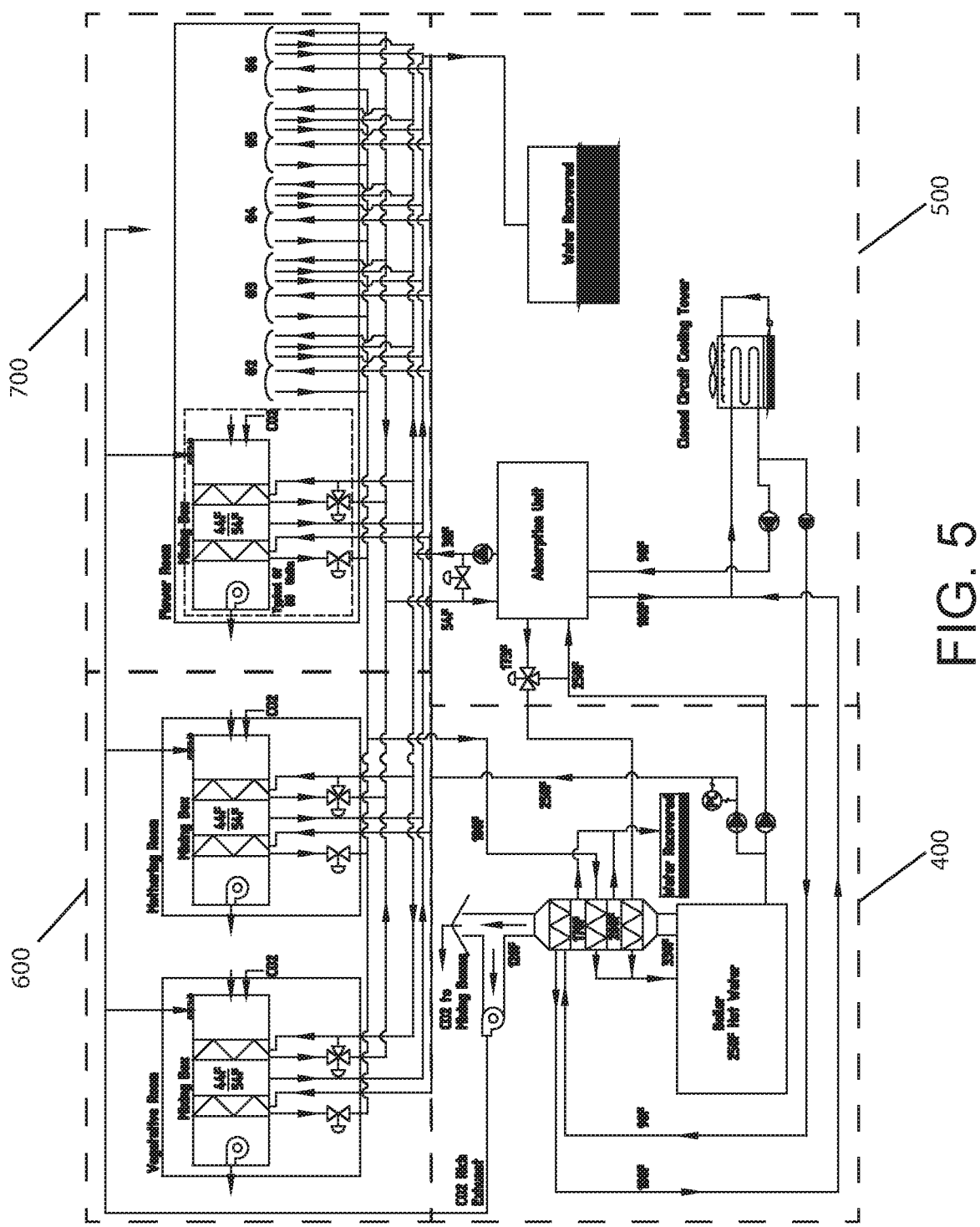
FIG. 5 is a schematic of an exemplary growing system, with a plurality of mixing boxes according to principles of the invention, divided into 4 portions, with each portion being shown, separately, in subsequent Figures.

Referring now to FIG. 4, another mixing box 300 according to principles of the invention is conceptually illustrated. Flow proceeds from right to left. FIG. 5 conceptually illustrates several such mixing boxes in use in a growing system.

The mixing box 300 of FIG. 4 includes several gas inlets. In one embodiment, an inlet 315 is provided for $CO_2$-containing exhaust from an engine, boiler or other apparatus that burns natural gas, methane or propane. The exhaust, products of combustion of natural gas, methane or propane, contains $CO_2$ and water vapor at an elevated temperature. Such exhaust may be supplied directly to the mixing box through inlet 315. In another embodiment, $CO_2$ from a gaseous or liquid $CO_2$ supply may be provided through inlet 315. The inlet 315 may be coupled to an exhaust conduit of a combustion apparatus or to a line coupled to a $CO_2$ supply. Any suitable duct, pipe or tube coupling may be used.

Alternatively or additionally, $CO_2$ may be supplied to the growing space through duct or line 315A. The supplied CO2 may comprise liquid $CO_2$, $CO_2$ gas, or $CO_2$ contained in products of combustion of propane, methane or natural gas. In such an embodiment, some or all $CO_2$ in the growing space that is not consumed by plants may be drawn into the mixing box 300 through a return gas (i.e., recirculation) inlet 355.

The invention is not limited to a mixing box 300 with inlet 315 or with inlet 315A to the growing space. Either inlet 315 or 315A may be provided within the scope of the invention. Both inlet 315 and inlet 315A may be provided within the scope of the invention.

Inlet 355 receives return gasses from the growing space. Such return gases include air, $CO_2$ and water vapor. The $CO_2$ is $CO_2$ that has not been consumed by the plants in the growing space.

Another inlet 310 receives outside air. Outside air may be filtered to minimize intake of airborne solids and insects. Multiple stages of filtration may be provided.

The mixing box 300 of FIG. 4 includes two coils in series. The first coil is a cooling coil 325, with an inlet 390 and outlet 395. The cooling coil 325 is disposed between the heating coil 340 and inlets 310, 315, 355. In an exemplary embodiment, chilled liquid (e.g., water, or water and glycol, or glycol) is introduced into the coil via the inlet 390. An electronically controlled valve 375 on the outlet 395 controls the flow through the coil 325, and therefore controls the heat transfer of the coil 325. A temperature sensor 372 detects temperature in the mixing box downstream of the cooling coil 325, and upstream of the heating coil 340, i.e., between the heating coil 340 and cooling coil 325. The controller 374 may open or close the valve 375 to maintain the temperature sensed by sensor 372 within a set range. The temperature promotes condensation at the cooling coil 325 to reduce the humidity of the gasses.

Considerable condensate forms from cooling in the mixing box. Such condensate is collected through an outlet 377 (e.g., an outlet at the bottom of a drip pan). The collected condensate may comprise most or all of the water used by the growing system for irrigation. Such condensate includes water vapor from transpiration within the growing system, water vapor from condensation of $CO_2$-containing exhaust from natural gas, methane or propane combustion, and water vapor from outside air.

The second coil is a heating coil 340, with an inlet 380 and outlet 385, downstream of the cooling coil 325, between the cooling coil 325 and the exit 348. In an exemplary embodiment heated liquid (e.g., water, or water and glycol, or glycol) is introduced into the coil via the inlet 380. An electronically controlled valve 370 on the outlet 385 controls the flow through the coil 340, and therefore controls the heat transfer of the coil 340. A temperature sensor 360 detects temperature in the mixing box downstream of the heating coil 340, i.e., between the heating coil 340 and exit 348. A controller 365 may open or close the valve 370 to maintain the temperature sensed by sensor 360 within a set range. Thus, the gasses cooled by the cooling coil to remove condensate are subsequently heated, before being delivered into the growing space through the exit 348. The elevated temperature reduces relativity humidity and achieves a temperature in the growing space environment that is suitable for plant growth.

The outlet of the mixing box 300 leads into a growing space of a growing system. One or more fans or blowers 345 propels the gasses through the outlet 348. The fan or blower may be a variable speed device or a constant speed device that is cycled on and off to achieve a desired volumetric flow rate.

FIG. 5 is a schematic of an exemplary growing system, with a plurality of mixing boxes according to principles of the invention. The exemplary growing system is divided into 4 portions 400, 500, 600, and 700, with each portion being shown, separately, in subsequent Figures, for clarification. The portions are delineated by dotted lines in FIG. 5. The exemplary growing system includes at least one mixing box for maintaining temperature, humidity and $CO_2$ within set ranges for growth in a growing space such as a vegetative room. The exemplary growing system includes at least one mixing box for maintaining temperature, humidity and $CO_2$ within set ranges for growth in a growing space such as a mothering room. The exemplary growing system includes a plurality of mixing boxes for maintaining temperature, humidity and $CO_2$ with set ranges for growth in a growing space such as a flower room. Natural gas, methane or propane combustion provides heat, $CO_2$ and water vapor laden exhaust. Heat exchangers use the heat to heat a liquid for heating coils and for an absorption chiller 502. The absorption chiller 502 alone or in combination with a cooling tower 510, 560 (open or closed circuit) provides cooled liquid for cooling coils. In addition to providing a $CO_2$-enriched temperature and humidity regulated air mixture for optimal plant growth, the system recovers substantial water from natural gas, methane or propane combustion, transpiration and outside air. The recovered water may constitute most or all of the water needed to provide irrigation and operate the system.

Figure 6:
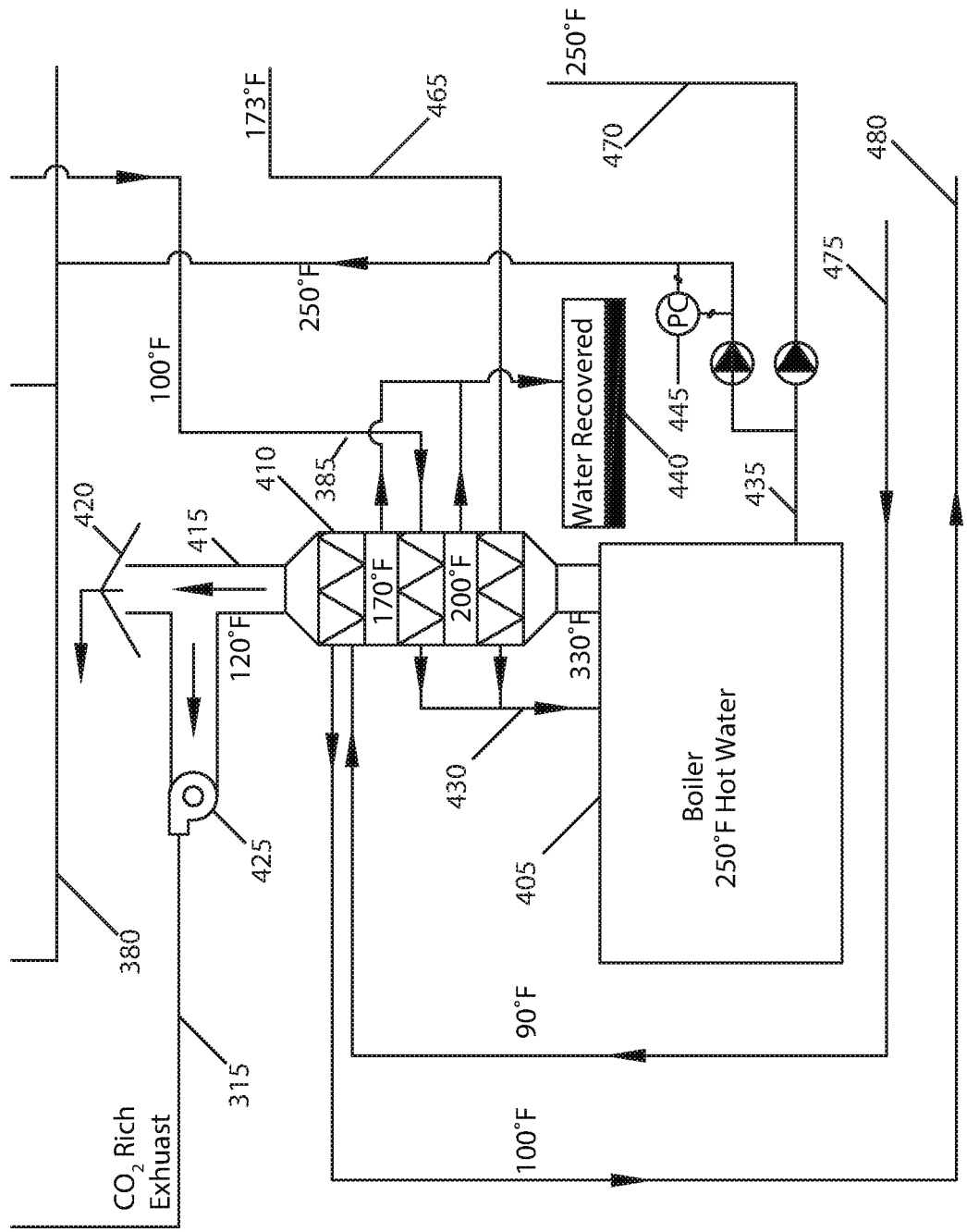
FIG. 6 is a schematic of portion 400 of the growing system of FIG. 5.

FIG. 6 is a schematic of portion 400 of the growing system of FIG. 5. The boiler 405 is a closed vessel in which water is heated. Nonlimiting examples include a fire-tube boiler and a water-tube boiler. Heated or vaporized water exits the boiler for use in various processes as described herein. In the exemplary embodiment, water is superheated under pressure to a temperature between the boiling point 212° F. and the critical temperature 705° F. In the exemplary embodiment the water is superheated to about 250° F. The superheated water exits the boiler 405 through line 435 which branches to lines 380 and 470. Line 380 supplies heated water to heating coils 340 of mixing boxes 300. Line 470 supplies heated water to the absorption chiller 502. A controller 445 controls flow through valves to line 380 and/or line 470 to achieve desired heating in the mixing box 300.

Water is returned to the boiler 405 through a return line 430. Return line 430 supplies water from coils of the heat exchanger 410. The coils of the heat exchanger 410 heat the water before the water is returned to the boiler 405. The heating enhances efficiency of the boiler 405 while reducing corrosion and risk of thermal shock. Concomitantly, heat transfer from the flue gasses to the water in the coils of the heat exchanger 410 reduces the temperature of the flue gasses to a temperature that can be used in the mixing boxes as described below.

The source of heat for the boiler 405 is combustion of fuel, particularly natural gas, methane or propane. Other fossil fuels are more chemically complicated than natural gas, methane and propane, and when combusted, release a variety of potentially harmful air pollutants. Burning methane, the main component of natural gas, releases carbon dioxide and water, both of which are useful in growing systems. Specifically, in combustion, one methane ($CH_4$) molecule reacts with two oxygen ($O_2$) molecules to produce a carbon dioxide ($CO_2$) molecule, two water ($H_2O$) molecules given off as steam or water vapor during the reaction, and energy. Since natural gas is mostly methane, the combustion of natural gas releases useful compounds and fewer byproducts than other fossil fuels. In the presence of excess oxygen, propane burns to form water and carbon dioxide. The balanced equation for combustion of propane is $C_3H_8+5O_2=3CO_2+4H_2O$.

The invention is not limited to a boiler 405. Other apparatus capable of burning methane, natural gas or propane, such as an engine for an electric generator, may be used without departing from the scope of the invention.

Exhaust from combustion passes through a multi-stage heat exchanger 410, reducing the exhaust temperature from about 330° F. to about 120° F. Each stage includes a coil through which a liquid flows to transfer heat from the exhaust to the liquid. Some or all of the exhaust may be supplied via a duct (inlet) 315 to the mixing box of FIG. 4. Any unused exhaust may be vented through a chimney 415 and a cap 420 to the atmosphere. The portion of the exhaust ($CO_2$-rich exhaust) supplied to mixing boxes may be controlled by one or more fans or blowers, such as blower 425, and one or more dampers, each being electronically controlled.

Coils of the heat exchanger 410 are cooled with water or other liquid from several sources. The exemplary heat exchanger 410 includes three coils, each supplied with liquid from a different source. One source is a return line 475 from a cooling tower 510, 560. This line 475 supplies water at about 90° F. Water is returned from the coil, via line 480, to the cooling tower 510, 560. Thus, lines 475 and 480 provide a closed loop.

Another source is a line 385 in fluid communication with heating coil outlets (e.g., outlet 385 in FIG. 4) of the mixing boxes. This line 385 supplies water at about 100° F. for cooling the hot exhaust. Another source is water from the return line 465 of an absorption chiller 502. This line supplies water at about 173° F. The stage of cooling of the heat exchanger with the lowest temperature is farthest from the exhaust outlet of the boiler 405.

Water output from the coils of the heat exchanger 410 is directed to the boiler 405 and cooling tower 510, 560. Specifically, output from the hottest coil and the intermediate coil are directed by line 430 to the boiler 405. Output from the coolest coil is directed by line 480 to the cooling tower 510, 560. To enhance efficiency while reducing corrosion and risk of thermal shock, return water is heated by heat exchangers before re-entering the boiler. The heating is accomplished using heat exchangers heated by flue gasses from the boiler. Heat transfer from the flue gasses also reduces the temperature of the flue gasses to a temperature that can be used in the mixing boxes as described below.

Figure 7:
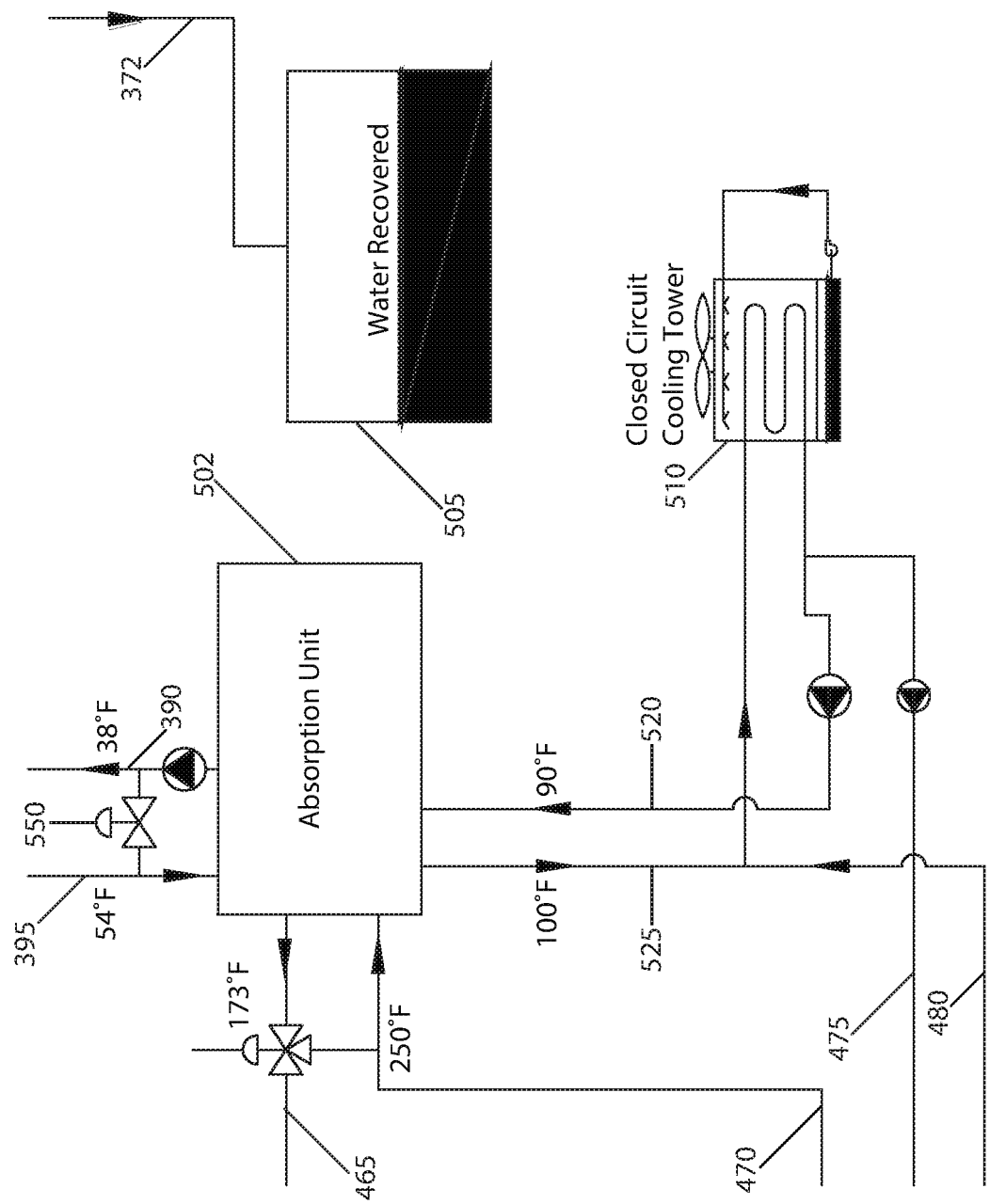
FIG. 7 is a schematic of portion 500 of the growing system of FIG. 5.
Figure 8:
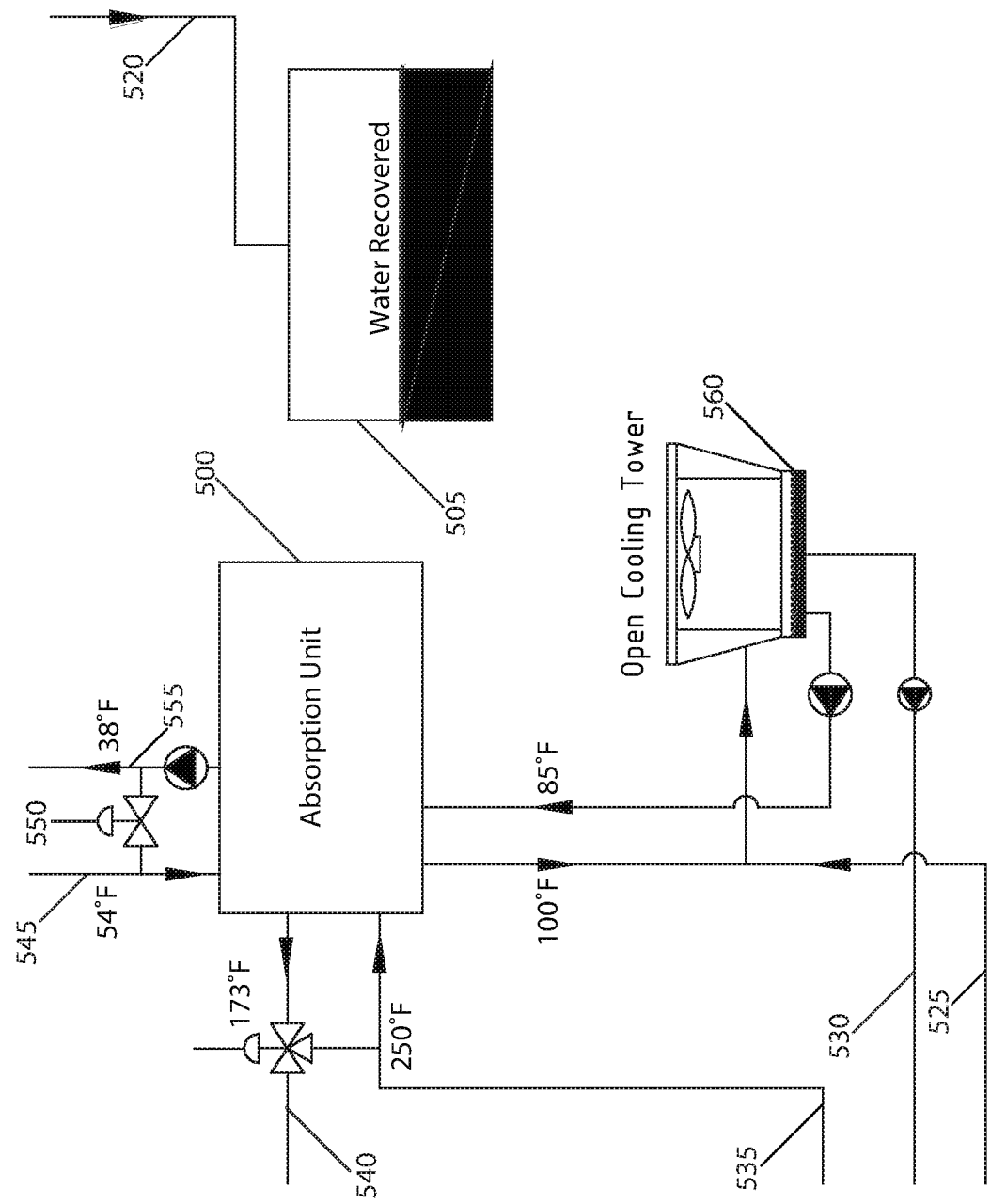
FIG. 8 is a schematic of an alternative configuration for portion 500 of the growing system of FIG. 5.

FIG. 7 is a schematic of portion 500 of the growing system of FIG. 5. This portion 500 includes an absorption chiller 502, cooling tower 510 (or cooling tower 560 in FIG. 8), and water recovery vessel 505. In general, the absorption chiller 502 uses a heat source (e.g., superheated water from the boiler 405, supplied via line 470) to provide the energy needed to drive an evaporative cooling process. The heat evaporates a liquid refrigerant (e.g., water) in a low partial pressure environment, thus extracting heat from its surroundings, providing a cooling effect. The gaseous refrigerant is absorbed by another liquid (e.g. a salt solution such as a solution of lithium bromide). The refrigerant-saturated liquid is then heated, causing the refrigerant to evaporate out. Thus, the system drives the water off the lithium bromide solution with heat. The hot gaseous refrigerant passes through a heat exchanger, transferring its heat outside the system and condenses. The process repeats with the condensed refrigerant being reheated.

The invention is not limited to an absorption chiller or to any particular type of absorption chiller, refrigerant or absorbent salt solution. Any absorption unit that uses liquid heated by combustion of natural gas, methane or propane to evaporate a refrigerant and produce an adequate supply of chilled liquid may be utilized to provide chilled liquid to a mixing box 300 in accordance with principles of the invention. Other refrigeration systems that cool water may be used in lieu of or in addition to an absorption unit. By way of example and not limitation, an engine fueled by natural gas, methane or propane, may power a compressor in a refrigeration cycle with a condenser to cool water.

A variety of lines supply liquids to and received liquids from the absorption chiller 502. The absorption unit 502 receives hot water via line 470 from the boiler 405. The hot water is returned to the heat exchanger 410 via line 465 and then to the boiler 405 via line 430. To enable condensation in the absorption chiller 502, cooling water is supplied from a cooling tower 510, 560 via line 520. The cooling water is then returned to the cooling tower 510, 560 via line 525. Chilled water is provided from the absorption chiller 502 to the mixing box 300 via line 390. The chilled water is returned from the mixing box 300 to the absorption chiller 502 via line 395.

The cooling tower 510, 560 rejects waste heat to the atmosphere by cooling water circulated in the system. The cooling tower may be open 560 or closed 510. An open cooling tower 560 evaporates water to remove process heat and cool the working fluid to near the wet-bulb air temperature. A closed cooling tower 510 uses an air stream to cool the working fluid to near the dry-bulb air temperature. The cooling tower 510, 560 supplies cooled water to the absorption chiller 502 to facilitate condensation in the absorption chiller 502.

A water collection vessel 505 receives condensate collected from mixing boxes via line 372. The collected water may be used for irrigation within the growing system and/or for any processes or equipment that require water as described herein.

Figure 9:
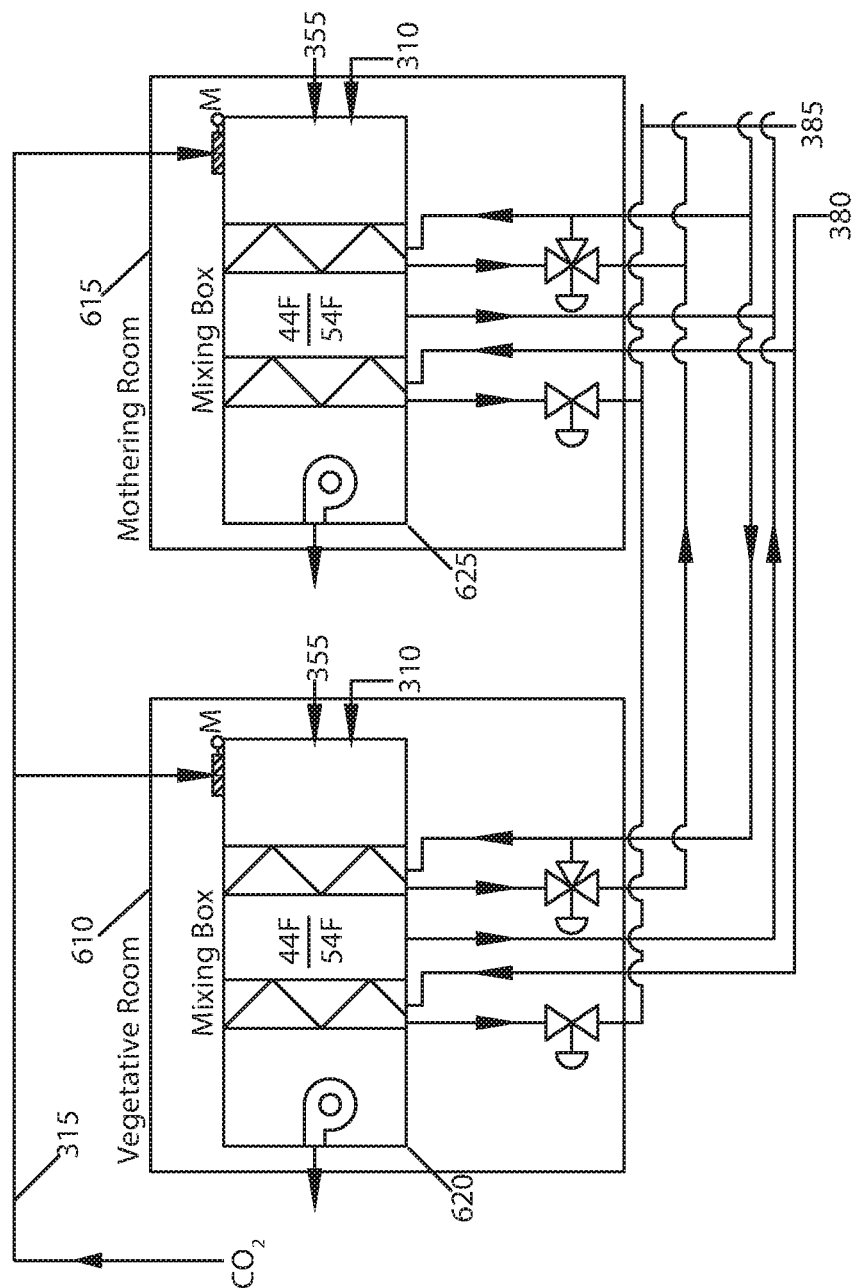
FIG. 9 is a schematic of portion 600 of the growing system of FIG. 5.

FIG. 9 is a schematic of portion 600 of the growing system of FIG. 5. Each mixing box 620, 625 is a mixing box as illustrated in FIG. 4 and described above. One illustrated mixing box 610 serves a vegetative room, while the other illustrated mixing box 615 serves a mothering room. Each room is served by at least one mixing box. One mixing box may serve multiple rooms, depending upon the size and capacity of the mixing box and rooms, without departing from the scope of the invention. A room may be served by more than one mixing box, without departing from the scope of the invention.

Three separate rooms are shown in the illustrated exemplary embodiment. Each room corresponds to a distinct stage of production. The principles of the invention are not limited to any particular plant. Any plant that thrives in an environment with regulated humidity, temperature and $CO_2$, may benefit from a system according to principles of the invention. Fewer or more rooms may be utilized without departing from the scope of the invention. In the exemplary embodiment, an initial stage of production is either a seed propagation room or a mothering room. For seed propagation, the room needs relatively high humidity, does not need $CO_2$, and can use low-level lighting only after leaves begin forming. However, another method of propagating new plants is using a known group of highly productive female "mothering plants," from which clippings are taken periodically (e.g., weekly) and planted in a "clone room" (aka "mothering room"). The clone room is where the clippings from mothering plants are propagated. The clippings need minimal light, no $CO_2$, and relatively high humidity and temperatures. The objective is to get the root systems started, not to start growing or photosynthesizing.

The vegetative room is where the seedlings/clones should maximize their growth of plant mass over a period of roughly 4 weeks. Temperatures may be in a similar range to the clone room, but with somewhat lower humidity levels. Many (e.g., 18) hours of daylight (or similar lighting) and high $CO_2$ concentration maximize growth and prevent the plants from flowering.

Figure 10:
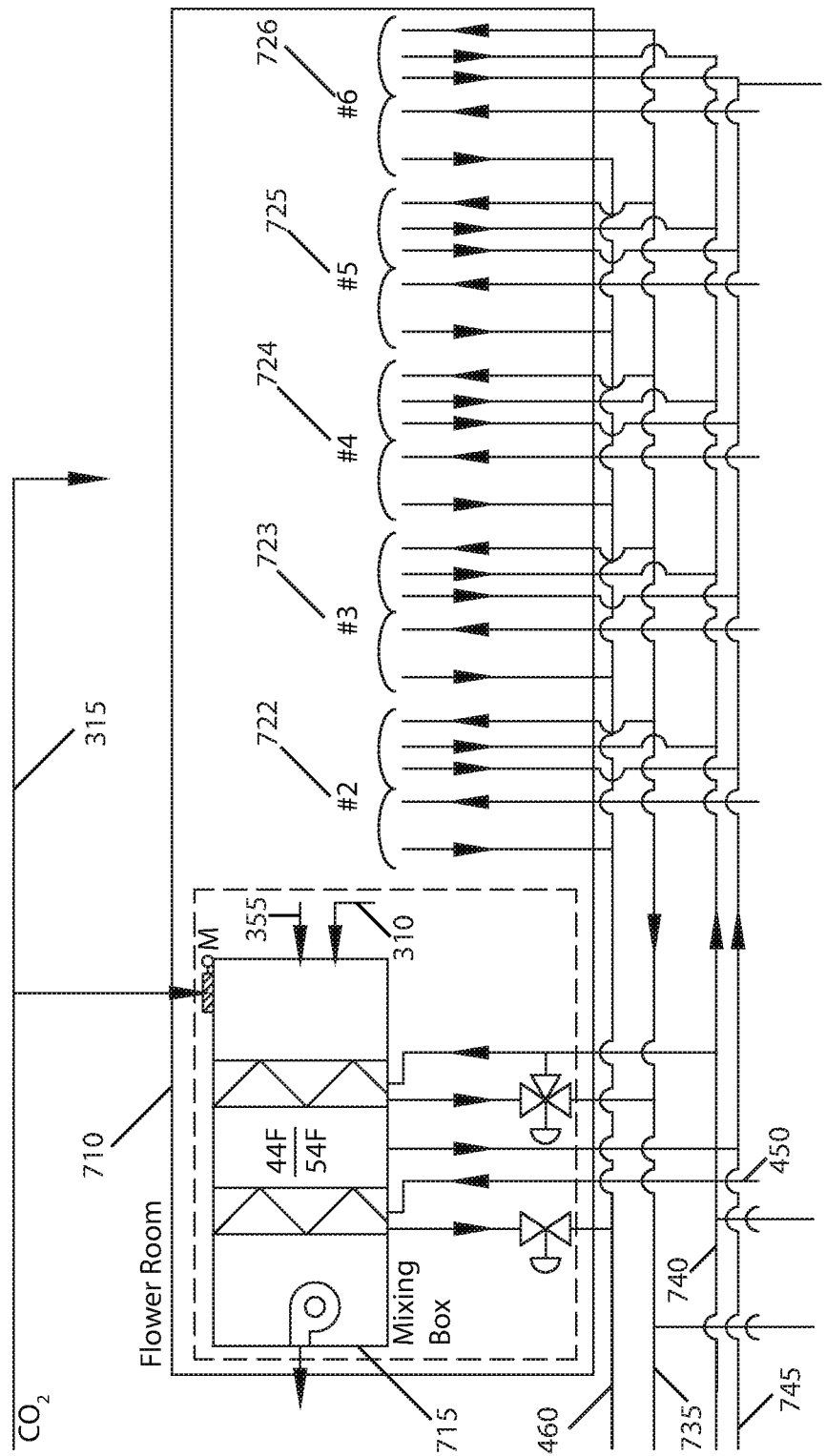
FIG. 10 is a schematic of portion 700 of the growing system of FIG. 5.

The final growing stage occurs in the flowering rooms, where plants are moved from the vegetative room and placed into a photoperiod of approximately 12 hours of light and 12 hours of darkness. FIG. 10 is a schematic of portion 700 of the growing system of FIG. 5, which includes 6 mixing boxes 715, 722, 723, 724, 725 and 726 for one or more flowering rooms 710. Each such mixing box receiving chilled water from the absorption cooler, heated water from the boiler, exhaust from natural gas, methane or propane combustion, ambient air, and recirculated air from a growing space, as discussed above with reference to the mixing box 300 of FIG. 4.

In the flowering rooms, plants reach their maximum rates of transpiration with the benefit of high levels of $CO_2$ and light. Vapor pressure deficits are controlled for optimal growth. Grow room temperatures and humidity are carefully monitored, especially at night. Humidity may be incrementally decreased (e.g., reduced on a weekly basis), to increase vapor pressure deficit and maintain consistent plant growth.

A final stage is a drying room, where plants are stripped and dried prior to processing. This room should have relatively warm temperatures, low humidity, and good ventilation to maximize drying. No lighting or supplemental $CO_2$ are necessary. One or more mixing boxes as described above may be used in a drying room to control temperature and dehumidification.

Thus, rooms may require different $CO_2$ concentrations, different relative humidities and temperatures and different lighting conditions. A system according to the invention provides at least one mixing box for maintaining a concentration of $CO_2$ and a temperature and relative humidity, each within a desired range, in each room. Additionally, all mixing boxes may utilize $CO_2$ and heat from the same boiler or other natural gas, methane or propane combustion apparatus and cooling from the same absorption chiller or other source of chilled water. Concomitantly, the system recovers water from humid ambient air, from exhaust from natural gas, methane or propane combustion, and from transpiration within the growing system, to provide all or the vast majority of water needed to drive the system and irrigate the plants.

The invention controls drivers for plant growth, including $CO_2$ and relative humidity. By way of example and not limitation, a vegetative state for a particular plant may be maintained by keeping growing hours per day around 18 hours. The plants may gain mass during this period. Natural and/or artificial light may be supplied. By maintaining $CO_2$ at a high concentration, such as about 1,500 ppm, the plant growth rate may increase appreciably. During the vegetative period, maintaining the relative humidity at around 50% may enhance growth. Plant mass before flowering should be greater than that attained in a traditional grow space. When the light period decreases to about 12 hours, flowering may commence, with more plant mass to bud. The plant may flower over about a 6 week period with 12 hour days. By maintaining $CO_2$ at a high concentration, bud mass may be enhanced appreciably. During the flowering stage the relative humidity may be steadily reduced to about 40% to encourage development of the buds.

Figure 11:
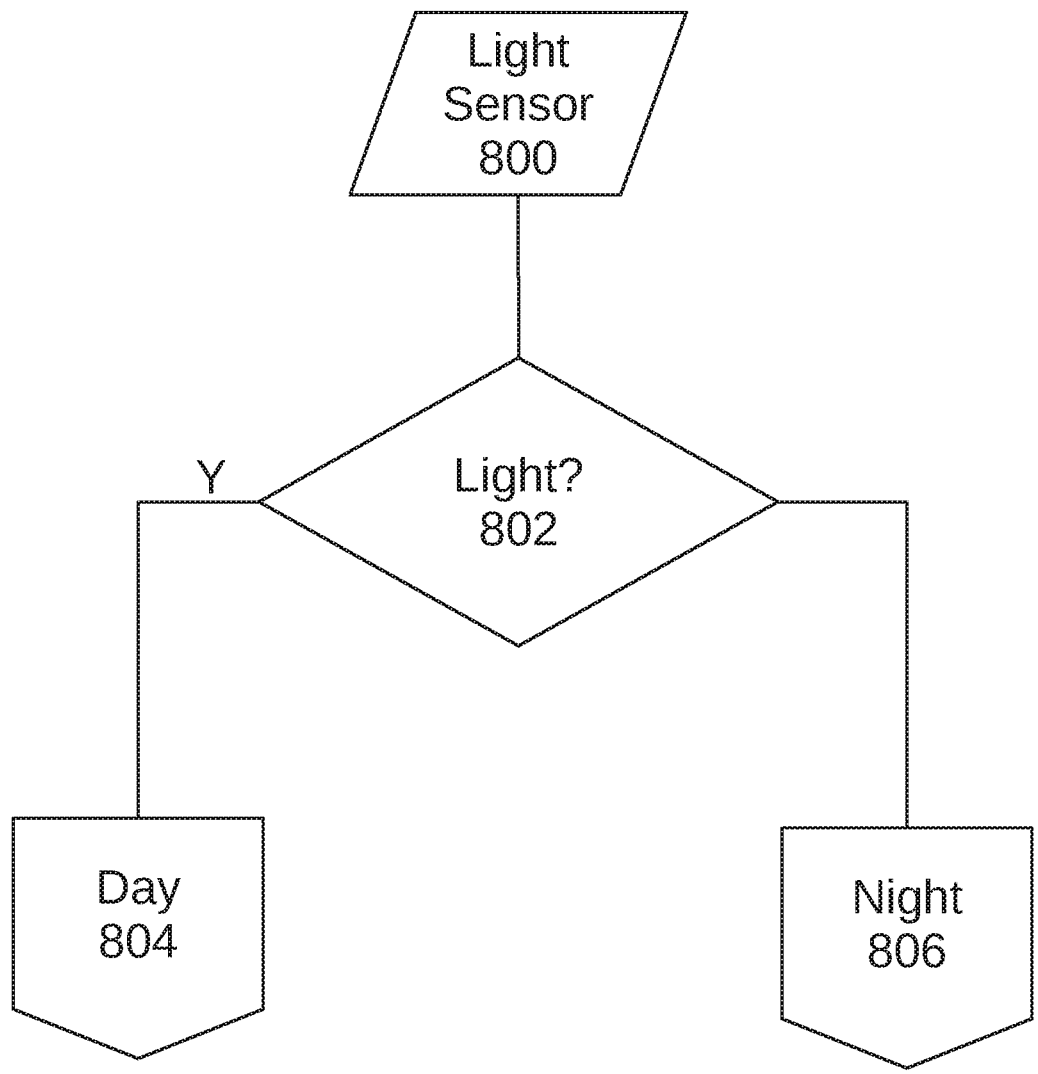
FIG. 11 is a high level flowchart of steps of determining whether to apply daylight or nighttime setpoints for controlling an exemplary mixing box for a growing system according to principles of the invention.

FIG. 11 provides a high level flowchart illustrates logical steps performed by a PLC or similar digital controller for a mixing box according to principles of the invention. In step 800, output from one or more light sensors 64 in a growing space is sampled (received) by the PLC via an input to the PLC. Output from the light sensors may be analog or digital. If analog, an analog to digital converter, typically included in PLCs and similar digital controllers, converts the analog output to digital data for processing. If the output indicates daylight conditions, as in steps 802, 804, then processing and control proceeds according to daylight conditions. If the output indicates nighttime conditions, as in steps 802, 806, then processing and control proceeds according to nighttime conditions.

In addition to or in lieu of a light sensor, a clock or timer may be used to determine whether daylight or nighttime parameters should be applied. Daylight setpoints are applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

Figure 12:
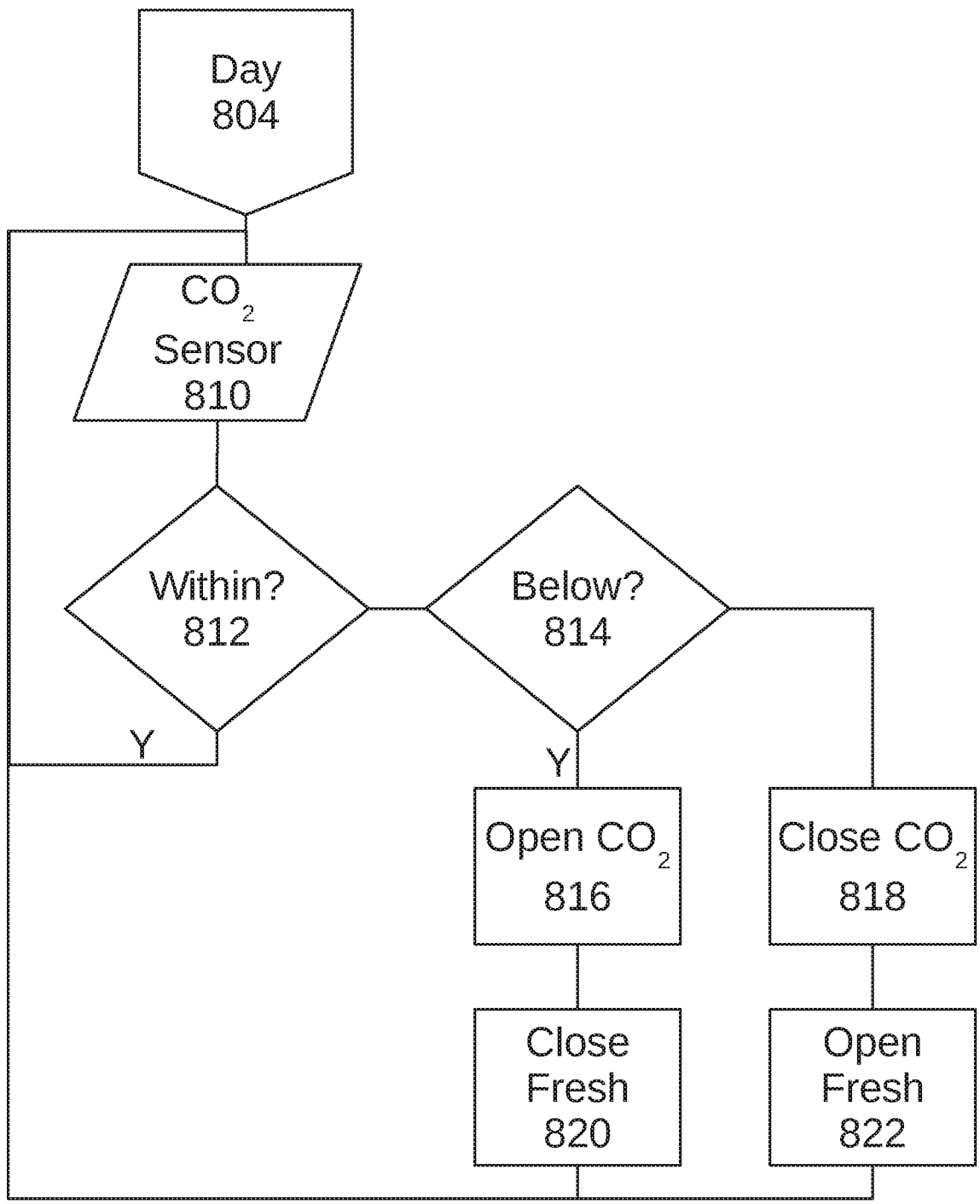
FIG. 12 is a high level flowchart of steps of controlling $CO_2$ concentration in a growing system according to a daylight setpoint using an exemplary mixing box for a growing system according to principles of the invention.

In FIG. 12, daylight processing of $CO_2$ sensor data is conceptually illustrated. In step 810, output from one or more $CO_2$ sensors 65 in a growing space is sampled (received) by the PLC via an input to the PLC. Output from the $CO_2$ sensors may be analog or digital. If analog, an analog to digital converter, typically included in PLCs and similar digital controllers, converts the analog output to digital data for processing. If, according to step 812, the $CO_2$ sensor data is within the setpoint range, then operating conditions may be maintained, and the sensors data may be read again subsequently for another round of evaluation. If, according to step 814, the $CO_2$ sensor data is not within the setpoint range, then operating conditions are adjusted. If $CO_2$ concentration is below a setpoint, the $CO_2$ inlet (damper) 215 may be fully or partially opened to admit more $CO_2$-containing exhaust, into the mixing box, as in step 816. Concomitantly, the fresh air inlet (damper) 205 may be fully or partially closed, as in step 818. In contrast, if $CO_2$ concentration is above a setpoint, the $CO_2$ inlet (damper) 215 is fully or partially closed to admit less $CO_2$-containing exhaust, into the mixing box, as in step 820. Concomitantly, the fresh air inlet (damper) 205 may be fully or partially opened, as in step 822.

Figure 13:
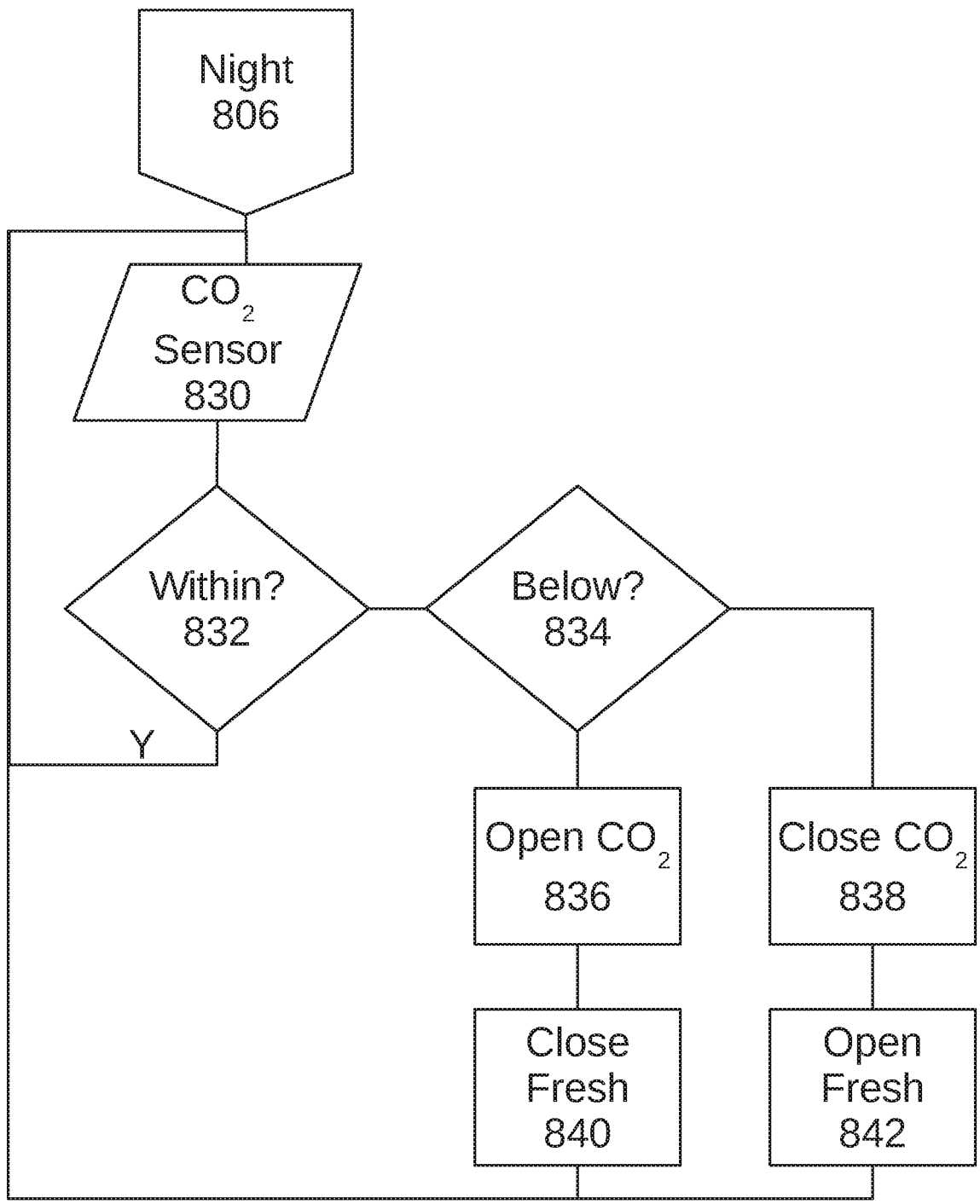
FIG. 13 is a high level flowchart of steps of controlling $CO_2$ concentration in a growing system according to a nighttime setpoint using an exemplary mixing box for a growing system according to principles of the invention.

Nighttime operation is very similar to daytime operation, except that the setpoint ranges are different. During nighttime, $CO_2$ setpoints are lower because there is no photosynthesis. In FIG. 13, nighttime processing of $CO_2$ sensor data is conceptually illustrated. In step 830, output from one or more $CO_2$ sensors 65 in a growing space is sampled (received) by the PLC via an input to the PLC. Output from the $CO_2$ sensors may be analog or digital. If analog, an analog to digital converter, typically included in PLCs and similar digital controllers, converts the analog output to digital data for processing. If, according to step 832, the $CO_2$ sensor data is within the setpoint range, then operating conditions may be maintained, and the sensors data may be read again subsequently for another round of evaluation. If, according to step 834, the $CO_2$ sensor data is not within the setpoint range, then operating conditions are adjusted. If $CO_2$ concentration is below a setpoint, the $CO_2$ inlet (damper) 215 may be fully or partially opened to admit more $CO_2$-containing exhaust, into the mixing box, as in step 836.

Concomitantly, the fresh air inlet (damper) 205 may be fully or partially closed, as in step 838. In contrast, if $CO_2$ concentration is above a setpoint, the $CO_2$ inlet (damper) 215 is fully or partially closed to admit less $CO_2$-containing exhaust, into the mixing box, as in step 840. Concomitantly, the fresh air inlet (damper) 205 may be fully or partially opened, as in step 842.

Figure 14:
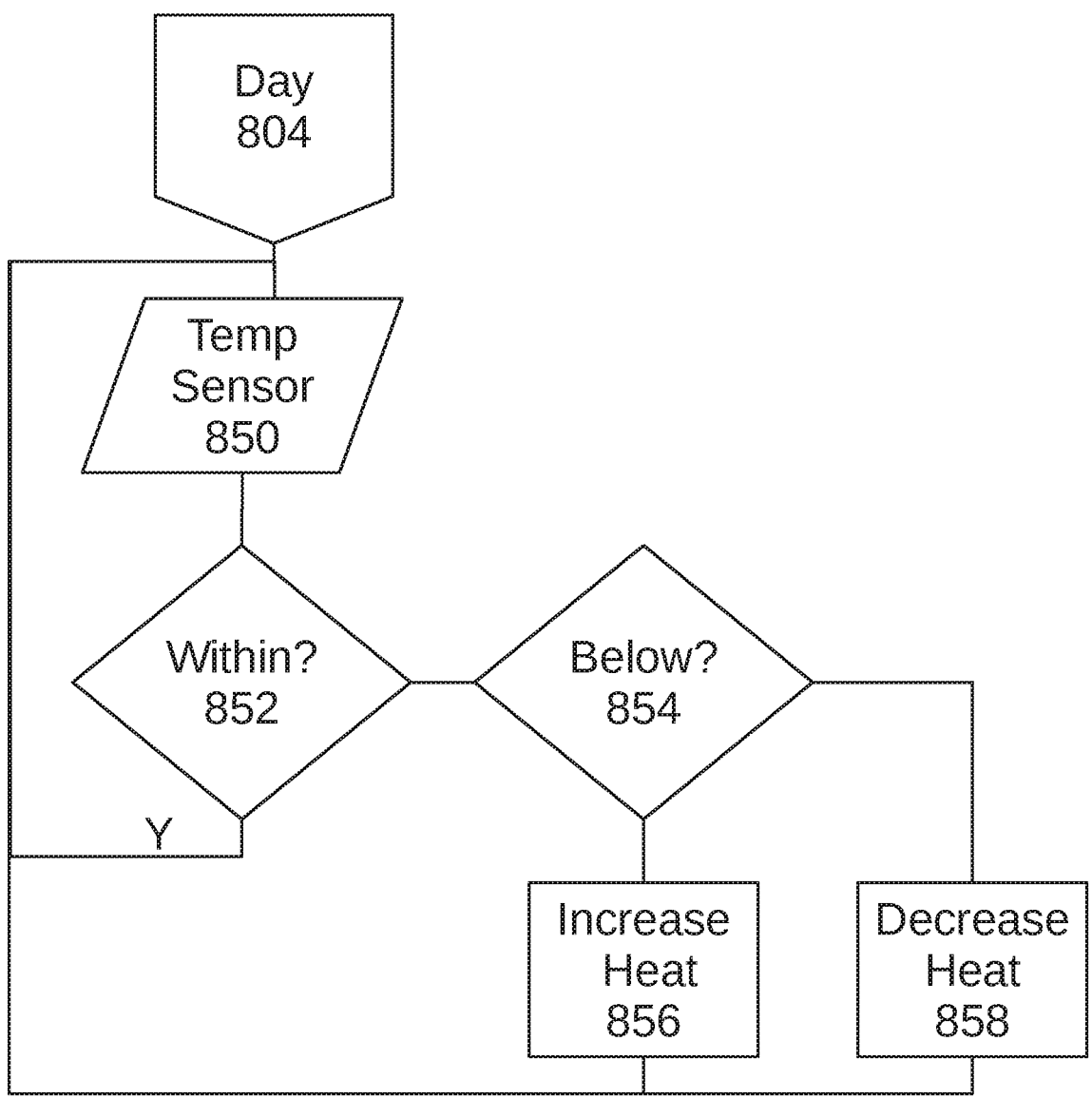
FIG. 14 is a high level flowchart of steps of controlling temperature in a growing system according to a daylight setpoint using an exemplary mixing box for a growing system according to principles of the invention.

The PLC performs similar processing of temperature data according to daytime and nighttime setpoints. In FIG. 14, daylight processing of temperature sensor 62 data is conceptually illustrated. In step 850, output from one or more temperature sensors 62 in a growing space is sampled (received) by the PLC via an input to the PLC. Output from the temperature sensors may be analog or digital. If analog, an analog to digital converter, typically included in PLCs and similar digital controllers, converts the analog output to digital data for processing. If, according to step 852, the temperature sensor data is within the setpoint range, then operating conditions may be maintained, and the sensors data may be read again subsequently for another round of evaluation. If, according to step 854, the temperature sensor data is not within the setpoint range, then operating conditions are adjusted. If temperature is below a setpoint, heating is increased by decreasing cooling, increasing heating and/or increasing $CO_2$-containing exhaust. Cooling may be decreased if RH is low or within a setpoint range. $CO_2$-containing exhaust may be increased if $CO_2$ concentration is low. Otherwise, heating may be increased by fully or partially opening valves to circulate more hot liquid through the heating coil lines 31, 32 and the heating coil 30 of the mixing box 15, as in step 856. If temperature is above a setpoint, heating is decreased by increasing cooling, decreasing heating and/or decreasing $CO_2$-containing exhaust. Cooling may be increased if RH is high or within a setpoint range. $CO_2$-containing exhaust may be decreased if $CO_2$ concentration is high. Otherwise, heating may be decreased by fully or partially closing valves to circulate less hot liquid through the heating coil lines 31, 32 and the heating coil 30 of the mixing box 15, as in step 858.

Figure 15:
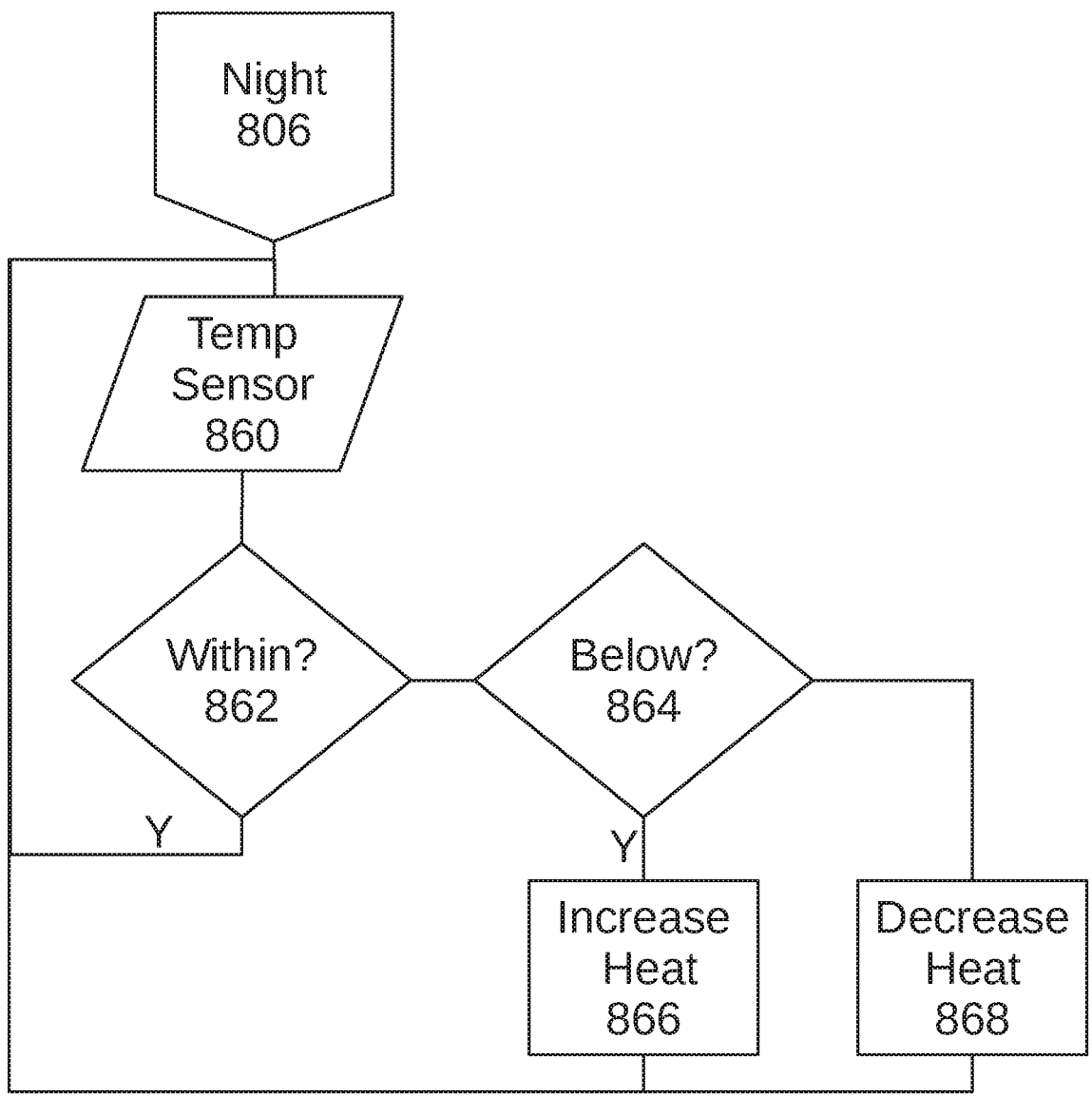
FIG. 15 is a high level flowchart of steps of controlling temperature in a growing system according to a nighttime setpoint using an exemplary mixing box for a growing system according to principles of the invention.

In FIG. 15, nighttime processing of temperature sensor 62 data is conceptually illustrated. A nighttime temperature setpoint may be lower than a daytime setpoint. In step 860, output from one or more temperature sensors 62 in a growing space is sampled (received) by the PLC via an input to the PLC. Output from the temperature sensors may be analog or digital. If analog, an analog to digital converter, typically included in PLCs and similar digital controllers, converts the analog output to digital data for processing. If, according to step 862, the temperature sensor data is within the setpoint range, then operating conditions may be maintained, and the sensors data may be read again subsequently for another round of evaluation. If, according to step 864, the temperature sensor data is not within the setpoint range, then operating conditions are adjusted. If temperature is below a setpoint, heating is increased by decreasing cooling, increasing heating and/or increasing $CO_2$-containing exhaust. Cooling may be decreased if RH is low or within a setpoint range. $CO_2$-containing exhaust may be increased if $CO_2$ concentration is low. Otherwise, heating may be increased by fully or partially opening valves to circulate more hot liquid through the heating coil lines 31, 32 and the heating coil 30 of the mixing box 15, as in step 866. If temperature is above a setpoint, heating is decreased by increasing cooling, decreasing heating and/or decreasing $CO_2$-containing exhaust. Cooling may be increased if RH is high or within a setpoint range. $CO_2$-containing exhaust may be decreased if $CO_2$ concentration is high. Otherwise, heating may be decreased by fully or partially closing valves to circulate less hot liquid through the heating coil lines 31, 32 and the heating coil 30 of the mixing box 15, as in step 868.

Figure 16:
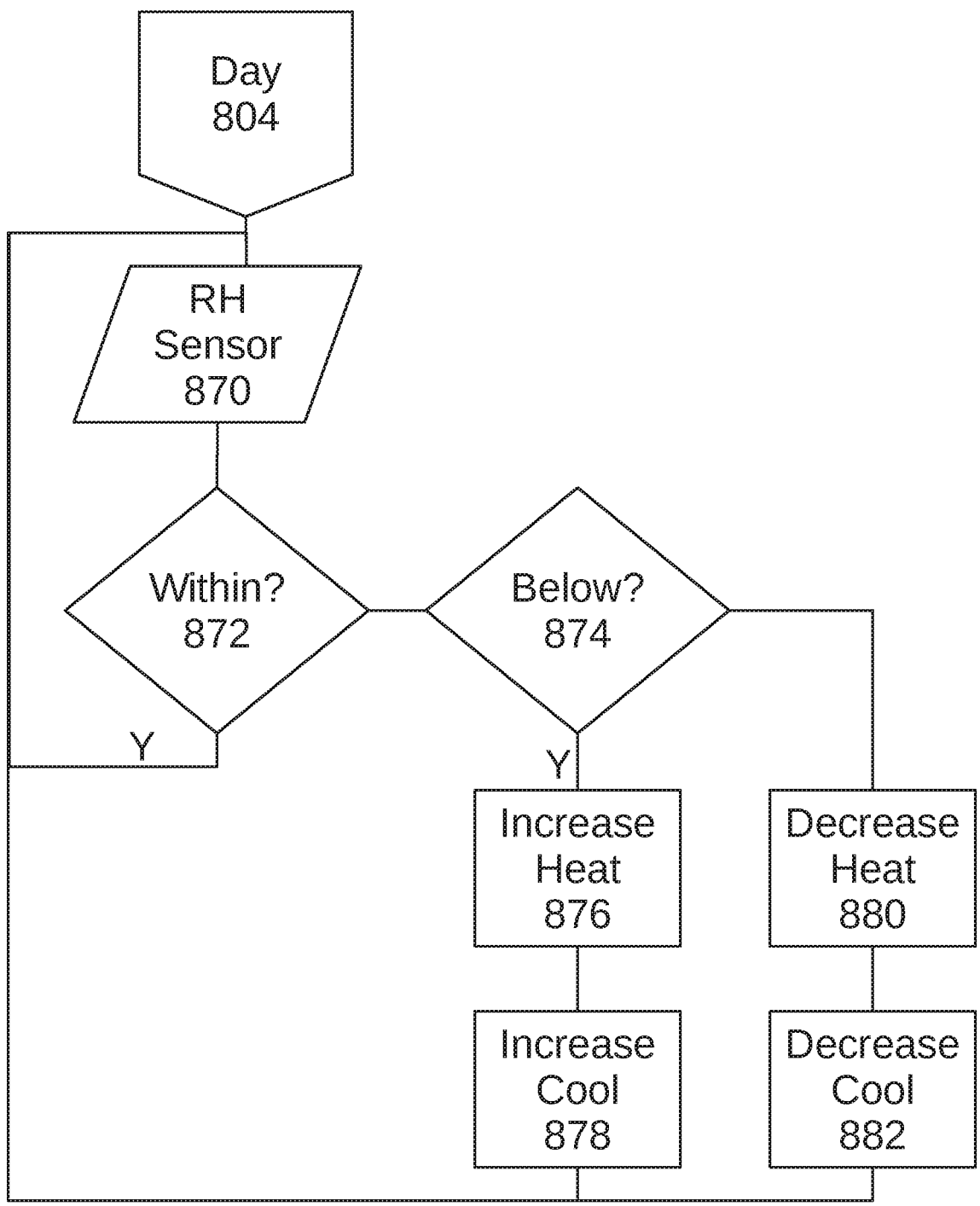
FIG. 16 is a high level flowchart of steps of controlling relative humidity in a growing system according to a daylight setpoint using an exemplary mixing box for a growing system according to principles of the invention.

The PLC performs similar processing of RH data according to daytime and nighttime setpoints. In FIG. 16, daylight processing of RH sensor 60 data is conceptually illustrated. In step 870, output from one or more RH sensors 60 in a growing space is sampled (received) by the PLC via an input to the PLC. Output from the RH sensors may be analog or digital. If analog, an analog to digital converter, typically included in PLCs and similar digital controllers, converts the analog output to digital data for processing. If, according to step 872, the RH sensor data is within the setpoint range, then operating conditions may be maintained, and the sensors data may be read again subsequently for another round of evaluation. If, according to step 874, the RH sensor data is not within the setpoint range, then operating conditions are adjusted. If RH is below a setpoint, heating may be increased, as in step 876, and/or cooling may be increased, as in step 878. Increasing heating increases the water vapor holding capacity of the air, and thereby reduces relative humidity. Increasing cooling enhances condensation, thereby removing more water vapor as condensate from the air. If RH is above a setpoint, heating may decreased, as in step 880, and/or cooling may be decreased, as in step 882. In creasing and decreasing of heating and/or cooling may be accomplished by opening and closing, fully or partially, valves that control flow, through lines 21-22, 31-32, of heated or cooled fluids, through coils 20, 30.

Figure 17:
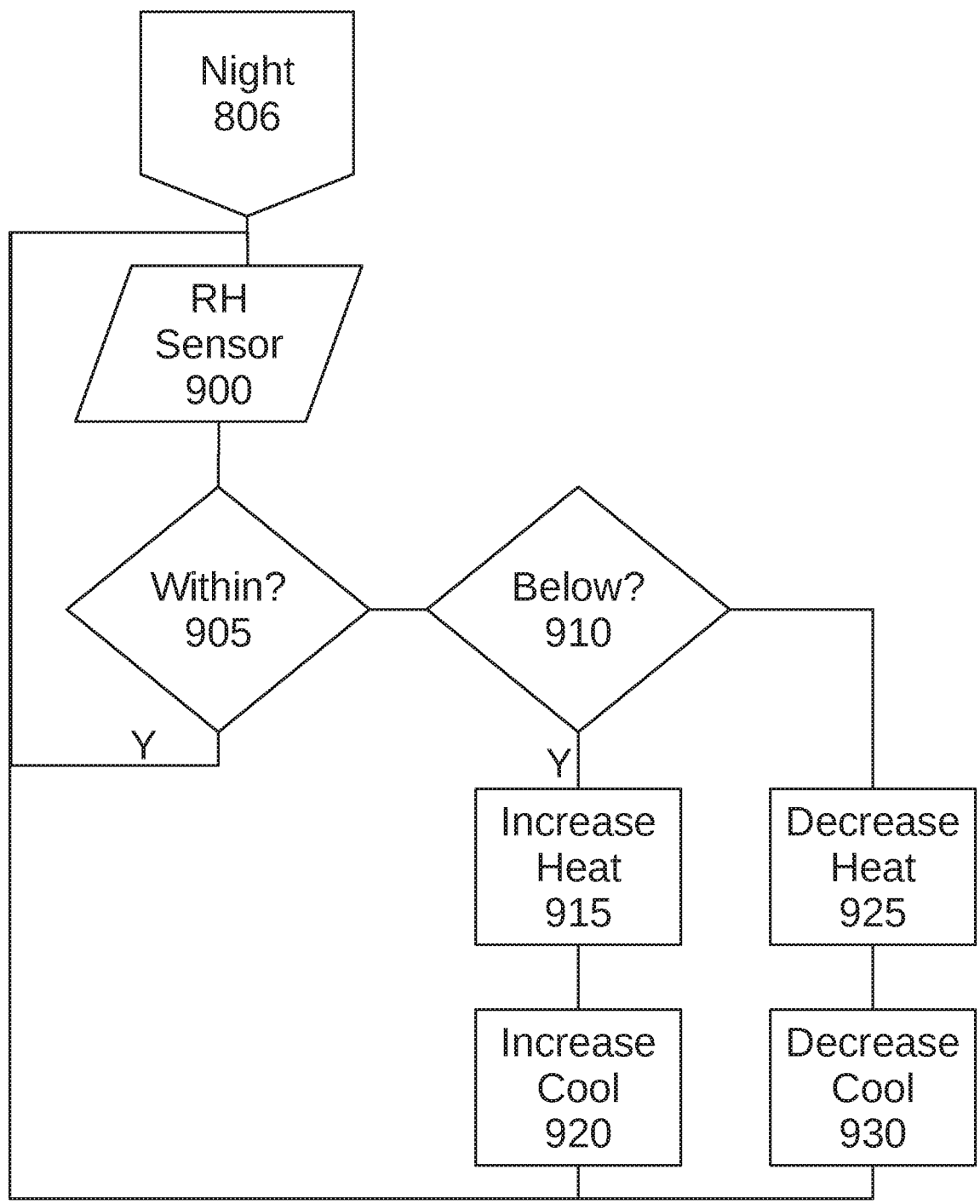
FIG. 17 is a high level flowchart of steps of controlling relative humidity in a growing system according to a nighttime setpoint using an exemplary mixing box for a growing system according to principles of the invention.

In FIG. 17, daylight processing of RH sensor 60 data is conceptually illustrated. In step 900, output from one or more RH sensors 60 in a growing space is sampled (received) by the PLC via an input to the PLC. Output from the RH sensors may be analog or digital. If analog, an analog to digital converter, typically included in PLCs and similar digital controllers, converts the analog output to digital data for processing. If, according to step 905, the RH sensor data is within the setpoint range, then operating conditions may be maintained, and the sensors data may be read again subsequently for another round of evaluation. If, according to step 910, the RH sensor data is not within the setpoint range, then operating conditions are adjusted. If RH is below a setpoint, heating may be increased, as in step 915, and/or cooling may be increased, as in step 920. Increasing heating increases the water vapor holding capacity of the air, and thereby reduces relative humidity. Increasing cooling enhances condensation, thereby removing more water vapor as condensate from the air. If RH is above a setpoint, heating may decreased, as in step 925, and/or cooling may be decreased, as in step 930. In creasing and decreasing of heating and/or cooling may be accomplished by opening and closing, fully or partially, valves that control flow, through lines 21-22, 31-32, of heated or cooled fluids, through coils 20, 30.

The invention enables control of relative humidity, temperature, and $CO_2$ concentration, according to setpoints, for a growing space. Daylight setpoints may be applied when the light sensor senses daylight lighting conditions, or when daylight conditions are otherwise determined, such as by a timer or clock. Nighttime setpoints are applied when the light sensor does not sense daylight lighting conditions, or when nighttime conditions are otherwise determined, such as by a timer or clock.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A mixing box system for a growing system comprising:
   a conduit supplying $CO_2$ to a growing space, the conduit including a conduit outlet;
   a housing through which gaseous fluids flow;
   a plurality of inlets to the housing, and an outlet from the housing, the outlet from the housing being spaced apart from the plurality of inlets to the housing, the plurality of inlets to the housing including a recirculation inlet through which air, water vapor and $CO_2$ from the growing space flow;
   a cooling coil disposed between the plurality of inlets and the outlet, the cooling coil including a cooling coil inlet line and a cooling coil outlet line;
   a heating coil, in series with the cooling coil, the heating coil being disposed between the cooling coil and the outlet, the heating coil includes a heating coil inlet line and a heating coil outlet line; and
   the cooling coil containing a chilled liquid while the heating coil contains a heated liquid.

2. The mixing box system of claim 1, wherein the plurality of inlets further include a coupling to the conduit outlet.

3. The mixing box system of claim 1, wherein the conduit supplying $CO_2$ comprises an exhaust outlet from an apparatus in which one of propane, methane and natural gas combusts.

4. The mixing box system of claim 3, wherein the plurality of inlets further includes a coupling to the conduit outlet, flow through the conduit proceeding into the mixing box and through outlet from the housing into the growing space.

5. The mixing box system of claim 4, further comprising a chilling apparatus, and the cooling coil inlet line supplying chilled liquid from the chilling apparatus, and the cooling coil outlet line returns chilled liquid from the cooling coil to the chilling apparatus.

6. The mixing box system of claim 1, wherein the heating coil inlet line supplies heated liquid from a heated liquid source, and the heating coil outlet line returns heated liquid to the heated liquid source.

7. The mixing box system of claim 1, further comprising a drain disposed beneath the cooling coil, the drain being fluidly coupled to a drain line, the drain line being fluidly coupled to a vessel.

8. The mixing box system of claim 1, further comprising a controllable fan within the housing and a controller operably coupled to and controlling operation and volumetric flow rate of the controllable fan.

9. The mixing box system of claim 1, further comprising a plurality of dampers, including at least one damper controlling flow through each inlet of the plurality of inlets, the at least one damper comprising an electrically actuated damper, a controller operably coupled to and controlling operation of each of the plurality of dampers.

10. The mixing box system of claim 1, further comprising a plurality of valves, including at least one valve controlling flow through the cooling coil and at least one valve controlling flow through the heating coil, each valve of the plurality of valves comprising an electrically actuated valve.

11. The mixing box system of claim 10, further comprising a controller operably coupled to and controlling operation of each of the plurality of valves.

12. The mixing box system of claim 1, the chilled liquid being comprised of water chilled by a chilling apparatus.

13. The mixing box system of claim 1, the chilled liquid being comprised of water and a glycol from the group of ethylene glycol and propylene glycol and the chilled liquid being chilled by a chilling apparatus.

14. The mixing box system of claim 1, the heated liquid being comprised of a water heated by a boiler.

15. The mixing box system of claim 1, wherein the plurality of inlets consist of a fresh air inlet, a coupling to the duct outlet supplying $CO_2$-containing products of combustion, and a recirculation air inlet, and further comprising a growing space, the growing space containing plants, the outlet being fluidly coupled to the growing space, and the recirculation inlet through which air and $CO_2$-containing products of combustion from the growing space flow.

16. The mixing box system of claim 1, further comprising a controller, and a plurality of sensors in the growing space, the plurality of sensors being operably coupled and providing input to the controller.

17. The mixing box system of claim 16, the plurality of sensors in the growing space including a humidity sensor, a $CO_2$ sensor, a temperature sensor and a light sensor, a plurality of setpoints stored on the controller, the plurality of setpoints including setpoints for daylight and setpoints for nighttime, daylight setpoints being applied when the light sensor senses daylight lighting conditions, and nighttime setpoints being applied when the light sensor does not sense daylight lighting conditions.

18. The mixing box system of claim 17, further comprising a plurality of dampers, including at least one damper controlling flow through each inlet of the plurality of inlets, the at least one damper comprising an electrically actuated damper, and the controller operably coupled to and controlling operation of each of the plurality of dampers.

19. The mixing box system of claim 18, further comprising a plurality of valves, including at least one valve controlling flow through cooling coil and at least one valve controlling flow through the heating coil, each valve of the plurality of valves comprising an electrically actuated valve, and the controller operably coupled to and controlling operation of each of the plurality of valves.

20. The mixing box system of claim 1, wherein the heated liquid is water, and the mixing box system further comprises
   a boiler having an exhaust outlet and a heated liquid outlet, and a liquid inlet;
   a chilling apparatus having a hot liquid outlet;
   a cooling tower, having a liquid inlet and a liquid outlet;
   a heat exchanger fluidly coupled to the exhaust outlet of the boiler, the heat exchanger including three coils including a first coil having an inlet fluidly coupled to the liquid outlet of the cooling tower and said first coil further having an outlet fluidly coupled to the inlet of the cooling tower, a second coil having an inlet fluidly coupled to the heating coil inlet line of the heating coil and said second coil having an outlet fluidly coupled to the liquid inlet of the boiler, and a third coil having an inlet fluidly coupled to the hot liquid outlet of the chilling apparatus and the third coil having an outlet fluidly coupled to the liquid inlet of the boiler.

* * * * *